United States Patent
Kazui et al.

(10) Patent No.: US 10,582,208 B2
(45) Date of Patent: *Mar. 3, 2020

(54) VIDEO ENCODING APPARATUS, VIDEO DECODING APPARATUS, VIDEO ENCODING METHOD, AND VIDEO DECODING METHOD

(71) Applicant: FUJITSU LIMITED, Kawasaki-shi, Kanagawa (JP)

(72) Inventors: Kimihiko Kazui, Kawasaki (JP); Junpei Koyama, Shibuya (JP); Satoshi Shimada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/015,233

(22) Filed: Feb. 4, 2016

(65) Prior Publication Data

US 2016/0156921 A1  Jun. 2, 2016

Related U.S. Application Data

(62) Division of application No. 14/040,847, filed on Sep. 30, 2013.

(30) Foreign Application Priority Data

Oct. 1, 2012  (JP) .................................. 2012-219663

(51) Int. Cl.
*H04N 19/503*  (2014.01)
*H04N 19/70*  (2014.01)
(Continued)

(52) U.S. Cl.
CPC ........... *H04N 19/503* (2014.11); *H04N 19/42* (2014.11); *H04N 19/44* (2014.11); *H04N 19/46* (2014.11); *H04N 19/70* (2014.11)

(58) Field of Classification Search
CPC ...... H04N 19/503; H04N 19/44; H04N 19/46; H04N 19/70
(Continued)

(56) References Cited

U.S. PATENT DOCUMENTS 6,154,496 A  11/2000  Radha
6,380,991 B1  4/2002  Teichmer
(Continued)

FOREIGN PATENT DOCUMENTS

EP  2683174 A2  1/2014
JP  2003-179938 A  6/2003

OTHER PUBLICATIONS

Kazui K., J. Koyama, S. Shimada, and A. Nakagawa, "AHG9: New high-level syntax for simple HEVC stream editing", Joint Collaborative Team on Video Coding (JCT-VC) of ITU-T SG 16 WP3 and ISO/IEC JTC 1/SC 29/WG11, 10th Meeting: Stockholm, SE, Jul. 11-20, 2012.*

(Continued)

*Primary Examiner* — Richard A Hansell, Jr.
(74) *Attorney, Agent, or Firm* — Fujitsu Patent Center

(57) ABSTRACT

A video encoding apparatus appends decoding delay and display delay correction information to encoded video data in order to ensure that even when one or more pictures that are later in encoding order than a starting encoded picture in a video data stream to be spliced to a trailing end of another encoded video data stream have been discarded from among pictures contained in the video data stream, the starting encoded picture and its subsequent pictures can be continuously decoded and displayed by a video decoding apparatus. The correction information is calculated based on a decoding interval between each discarded picture and a picture that immediately precedes the discarded picture. The video decoding apparatus corrects the decoding delay and display (Continued)

delay of the starting encoded picture and its subsequent pictures by using the calculated correction information.

3 Claims, 12 Drawing Sheets

(51) Int. Cl.
    *H04N 19/46*     (2014.01)
    *H04N 19/44*     (2014.01)
    *H04N 19/42*     (2014.01)

(58) Field of Classification Search
    USPC .......................................................... 375/240
    See application file for complete search history.

(56) References Cited

U.S. PATENT DOCUMENTS

| | | | |
|---|---|---|---|
| 2006/0093045 A1 | 5/2006 | Anderson et al. | |
| 2006/0107187 A1* | 5/2006 | Hannuksela | H04L 47/2416 714/776 |
| 2009/0100482 A1 | 4/2009 | Rodriguez et al. | |
| 2009/0328096 A1* | 12/2009 | Krause | H04N 21/23424 725/32 |
| 2010/0129056 A1* | 5/2010 | Connery | G11B 27/034 386/241 |
| 2010/0246662 A1 | 9/2010 | Koto et al. | |
| 2011/0292995 A1* | 12/2011 | Kubota | H04N 21/23424 375/240.02 |
| 2012/0016965 A1* | 1/2012 | Chen | H04N 21/23439 709/219 |
| 2013/0170561 A1 | 7/2013 | Hannuksela | |
| 2013/0272430 A1* | 10/2013 | Sullivan | H04N 19/70 375/240.26 |
| 2013/0279564 A1* | 10/2013 | Wang | H04N 19/70 375/240.02 |
| 2013/0294499 A1* | 11/2013 | Wang | H04N 19/70 375/240.02 |

OTHER PUBLICATIONS

Kazui K., J. Koyama, S. Shimada, and A. Nakagawa, "AHG9: New high-level syntax for simple HEVC stream editing", Joint Collaborative Team on Video Coding (JCT-VC) of ITU-T SG 16 WP3 and ISO/I EC JTC 1/SC 29/WG11, 10th Meeting: Stockholm, SE, Jul. 11-20, 2012 (Year: 2012) (Year: 2012).*
MXOA—Office Action of Mexico Patent Application No. MX/a/2015/010571 dated Feb. 19, 2016 with English translation of the Office Action.
JPOA—Office Action of Japanese Patent Application No. 2012-219663 dated Mar. 29, 2016, with English translation of the Office Action.
USPTO, [Hansell] Final Rejection, Feb. 5, 2016, in parent U.S. Appl. No. 14/040,847 [pending].
The Society of Motion Picture and Television Engineers (SMPTE Standard for Television—Splice Points for MPEG-2 Transport Streams, SMPTE 312M-2001, Revision of SMPTE 312M-1999, 2001.
CAOA—Office Action of Canadian Patent Application No. 2,828,843 dated Apr. 16, 2015.
Bross et al., "High efficiency video coding (HEVC) text specification draft 8", Joint Collaborative Team on Video Coding (JCT-VC) of ITU-T SG16 WP3 and ISO/IEC JTC1/JSC29NV/WG11, 10th meeting, Jul. 11-20, 2012.
Kazui, K. et al., "AHG9: New high-level syntax for simple HEVC stream editing", 101 MPEG Meeting; Jul. 11-20, 2012; Stockholm, SE; (Motion Picture Expert Group or ISO/IEC JTC 1/Sc 29WG 11); Document No. JCTVC-J0137, Jul. 12, 2012.

ESSR—European Search Report of European Patent Application No. 13184933.3 dated Aug. 1, 2014.
U.S. Office Action dated Aug. 28, 2015 for related U.S. Appl. No. 14/040,847.
MXOA—Office Actin of Mexican Patent Application No. MX/a/2013/011346 dated Nov. 6, 2015, with English Translation.
European Office Action of European Patent Application No. 13184933.3 dated Sep. 18, 2015.
USPTO, [Hansell], Non-Final Rejection dated May 20, 2016 in related U.S. Appl. No. 15/015,204 [pending].
USPTO, [Hansell], Non-Final Rejection dated May 6, 2016 in related U.S. Appl. No. 15/015,221 [pending].
USPTO, [Hansell], Non-Final Rejection dated May 6, 2016 in related U.S. Appl. No. 15/015,247 [pending].
CNOA—Office Action of Chinese Patent Application No. 201310462438.7 dated Jul. 4, 2016, with English translation of the Office Action.
MXOA—Office Action of Mexico Patent Application No. MX/a/2013/011346 dated Mar. 31, 2016, with English translation of the Office Action.
CAOA—Canadian Office Action dated Nov. 3, 2016 for Canadian Application No. 2,910,432.
CAOA—Canadian Office Action dated Nov. 9, 2016 for Canadian Application No. 2,910,306.
CNOA—Notification of the Second Office Action for Chinese Patent Application No. 201310462438.7, dated Dec. 8, 2016, with English translation.
USPTO, [Hansell], Final Rejection dated May 17, 2017 in related U.S. Appl. No. 14/040,847.
USPTO, [Hansell], Non-Final Rejection dated Jun. 5, 2017 in related U.S. Appl. No. 15/015,221.
USPTO, [Hansell], Non-Final Rejection dated Nov. 2, 2016 in related U.S. Appl. No. 14/040,847.
USPTO, [Hansell], Final Rejection dated Nov. 18, 2016 in related U.S. Appl. No. 15/015,204.
USPTO, [Hansell], Final Rejection dated Dec. 28, 2016 in related U.S. Appl. No. 15/015,221.
USPTO, [Hansell], Final Rejection dated Dec. 8, 2016 in related U.S. Appl. No. 15/015,247.
USPTO, [Hansell], Non-Final Rejection dated Aug. 2, 2017 in related U.S. Appl. No. 15/015,204.
CAOA—Canadian Office Action dated Feb. 6, 2017 for Canadian Patent Application No. 2,910,309.
CAOA—Canadian Office Action dated Feb. 8, 2017 for Canadian Patent Application No. 2,910,488.
USPTO, [Hansell], Non-Final Rejection dated Jul. 24, 2017 in related U.S. Appl. No. 15/015,247.
CAOA—Office Action of Canadian Patent Application No. 2,910,432 dated Nov. 16, 2017.
CNOA—Office Action of Chinese Patent Application No. 201611036028.6 dated Mar. 4, 2019, with English translation of the Office Action.
The Society of Motion Picture and Television Engineers (SMPTE); Splice Points for MPEG-2 Transport Streams, Standard for Television, SMPTE 312M-2001, Revision of SMPTE 312M-1999, 2001, 20 pages.
Office Action of India Patent Application No. 1099/KOL/2013 dated Jul. 18, 2018.
CNOA—First Office Action of Chinese Patent Application No. 201611036705.4 dated Jan. 23, 2019, with English translation of the Office Action.
CNOA—Office Action of Chinese Patent Application No. 201611036703.5 dated Jul. 3, 2019, with English translation of the Office Action.
CNOA—Office Action of Chinese Patent Application No. 201611036702.0 dated May 21, 2019, with English translation of the Office Action.
CNOA—Office Action of Chinese Patent Application No. 201611036702.0 dated Dec. 5, 2019, with English translation.

* cited by examiner

VIDEO ENCODING APPARATUS, VIDEO DECODING APPARATUS, VIDEO ENCODING METHOD, AND VIDEO DECODING METHOD

CROSS-REFERENCE TO RELATED APPLICATION

This application is a divisional of application Ser. No. 14/040,847, filed Sep. 30, 2013, which is based upon and claims the benefit of priority of the prior Japanese Patent Application No. 2012-219663, filed on Oct. 1, 2012, and the entire contents of which are incorporated herein by reference.

FIELD

The embodiments discussed herein are related to a video encoding apparatus and video encoding method that can edit encoded video data without decoding the video data, and also relates to a video decoding apparatus and video decoding method for decoding video data encoded by such a video encoding apparatus.

BACKGROUND

Generally, the amount of data used to represent video data is very large. Accordingly, an apparatus handling such video data compresses the video data by encoding before transmitting the video data to another apparatus or before storing the video data in a storage device. Coding standards such as MPEG-2 (Moving Picture Experts Group Phase 2), MPEG-4, and H.264 MPEG-4 Advanced Video Coding (MPEG-4 AVC/H.264), devised by the International Standardization Organization/International Electrotechnical Commission (ISO/IEC), are typical video coding standards widely used today.

Such coding standards employ inter-coding, a coding method that encodes a picture by using not only information from itself but also information from pictures before and after it, and intra-coding, a coding method that encodes a picture by using only information contained in the picture to be encoded. The inter-coding method uses three types of picture, referred to as the intra-coded picture (I picture), the forward predicted picture (P picture) which is usually predicted from a past picture, and the bidirectional predicted picture (B picture) which is usually predicted from both past and future pictures.

Generally, the amount of code of a picture or block encoded by inter-coding is smaller than the amount of code of a picture or block encoded by intra-coding. In this way, the amount of code varies from picture to picture within the same video sequence, depending on the coding mode selected. Similarly, the amount of code varies from block to block within the same picture, depending on the coding mode selected. Therefore, in order to enable a data stream containing encoded video to be transmitted at a constant transmission rate even if the amount of code temporally varies, a transmit buffer for buffering the data stream is provided at the transmitting end, and a receive buffer for buffering the data stream is provided at the receiving end.

MPEG-2 and MPEG-4 AVC/H.264 each define the behavior of a receive buffer in an idealized video decoding apparatus called the video buffering verifier (VBV) or the coded picture buffer (CPB), respectively. For convenience, the idealized video decoding apparatus will hereinafter be referred to simply as the idealized decoder. It is specified that the idealized decoder performs instantaneous decoding that takes zero time to decode. For example, Japanese Laid-open Patent Publication No. 2003-179938 discloses a video encoder control method concerning the VBV.

In order to not cause the receive buffer in the idealized decoder to overflow or underflow, the video encoder controls the amount of code to guarantee that all the data needed to decode a given picture are available in the receive buffer when the idealized decoder decodes that given picture.

When the video encoder is transmitting an encoded video data stream at a constant transmission rate, the receive buffer may underflow if the transmission of the data needed to decode the picture has not been completed by the time the picture is to be decoded and displayed by the video decoder. That is, the receive buffer underflow refers to a situation in which the data needed to decode the picture are not available in the receive buffer of the video decoder. If this happens, the video decoder is unable to perform decoding, and frame skipping occurs.

In view of this, the video decoder displays the picture after delaying the stream by a prescribed time from its receive time so that the decoding can be done without causing the receive buffer to underflow. As described earlier, it is specified that the idealized decoder accomplishes decoding in zero time. As a result, if the input time of the i-th picture to the video encoder is t(i), and the decode time of the i-th picture at the idealized decoder is tr(i), then the earliest time at which the picture becomes ready for display is the same as tr(i). Since the picture display period {t(i+1)−t(i)} is equal to {tr(i+1)−tr(i)} for any picture, the decode time tr(i) is given as tr(i)=t(i)+dly, i.e., the time delayed by a fixed time dly from the input time t(i). This means that the video encoder has to complete the transmission of all the data needed for decoding to the receive buffer by the time tr(i).

Referring to FIG. 1, a description will be given of how the receive buffer operates. In FIG. 1, the abscissa represents the time, and the ordinate represents the buffer occupancy of the receive buffer. Solid line graph 100 depicts the buffer occupancy as a function of time.

The buffer occupancy of the receive buffer is restored at a rate synchronized to a prescribed transmission rate, and the data used for decoding each picture is retrieved from the buffer at the decode time of the picture. The data of the i-th picture starts to be input to the receive buffer at time at(i), and the final data of the i-th picture is input at time ft(i). The idealized decoder completes the decoding of the i-th picture at time tr(i), and thus the i-th picture becomes ready for display at time tr(i). However, if the data stream contains a B picture, the actual display time of the i-th picture may become later than tr(i) due to the occurrence of picture reordering (changing the encoding order).

The method of describing the decode time and display time of each picture in MPEG-4 AVC/H.264 will be described in detail below.

In MPEG-4 AVC/H.264, supplemental information not directly relevant to the decoding of pixels is described in a supplemental enhancement information (SEI) message. Tens of SEI message types are defined, and the type is identified by a payloadType parameter. The SEI is appended to each picture.

BPSEI (Buffering Period SEI) as one type of SEI is appended to a self-contained picture, that is, a picture (generally, an I picture) that can be decoded without any past pictures. A parameter InitialCpbRemovalDelay is described in the BPSEI. The InitialCpbRemovalDelay parameter indicates the difference between the time of arrival in the receive buffer of the first bit of the BPSEI-appended picture and the decode time of the BPSEI-appended picture. The resolution of the difference is 90 kHz. The decode time tr(0) of the first picture is the time of arrival in the video decoder of the first bit of the encoded video data (the time is designated as 0); i.e., the decode time is delayed from time at(0) by an amount of time equal to InitialCpbRemovalDelay÷90,000 [sec].

Generally, PTSEI (Picture Timing SEI) as one type of SEI is appended to each picture. Parameters CpbRemovalDelay and DpbOutputDelay are described in the PTSEI. The CpbRemovalDelay parameter indicates the difference between the decode time of the immediately preceding BPSEI-appended picture and the decode time of the PTSEI-appended picture. The DpbOutputDelay parameter indicates the difference between the decode time of the PTSEI-appended picture and the display time of that picture. The resolution of these differences is one field picture interval. Accordingly, when the picture is a frame, the value of each of the parameters CpbRemovalDelay and DpbOutputDelay is a multiple of 2.

The decode time tr(i) of each of the second and subsequent pictures is delayed from the decode time tr(0) of the first picture by an amount of time equal to tc*CpbRemovalDelay(i) [sec]. CpbRemovalDelay(i) is the CpbRemovalDelay appended to the i-th picture. On the other hand, tc is the inter-picture time interval [sec]; for example, in the case of 29.97-Hz progressive video, tc is 1001/60000.

The display time of each of the pictures, including the BPSEI-appended picture, is delayed from tr(i) by an amount of time equal to tc*DpbOutputDelay(i). DpbOutputDelay(i) is the DpbOutputDelay appended to the i-th picture. That is, after time tr(0), each picture is decoded and displayed at time equal to an integral multiple of tc.

Depending on the purpose of video data, the encoded video may be edited. Editing the encoded video involves dividing the encoded video data into smaller portions and splicing them to generate a new encoded video data stream. For example, insertion of another video stream (for example, an advertisement) into the currently broadcast video stream (i.e., splicing) is one example of edit operation.

When editing inter-frame predictive coded video, particularly in the case of an inter-coded picture, the encoded picture cannot be decoded correctly by itself. Accordingly, when splicing two encoded video data streams at a desired picture position, an encoded video data editing machine first decodes the two encoded video data streams to be spliced and then splice them on a decoded picture-by-picture basis, and thereafter re-encodes the spliced video data.

However, since the task of re-encoding can be very laborious, in particular, in the case of real time processing such as splicing, it is common to restrict the splicing point and edit the encoded video data directly by eliminating the need for re-encoding. When splicing two encoded video data streams by editing without the need for re-encoding, the first picture of the encoded video data stream to be spliced on the temporally downstream side has to be an I picture. Furthermore, the GOP structure of the encoded video data stream to be spliced on the temporally downstream side is limited to the so-called closed GOP structure in which all the pictures that follow the starting I picture are decodable without referring to any pictures temporally preceding the starting I picture. With this arrangement, it is possible to correctly decode all the pictures that follow the starting I picture of the encoded video data stream spliced on the downstream side by editing at the desired splicing point.

However, since the coding efficiency of the closed GOP structure is lower than that of the non-closed GOP structure, the non-closed GOP structure may be employed. In that case, some of the pictures immediately following the starting I picture after the splicing point are not correctly decoded, but since these pictures are pictures preceding the starting I picture in display order, there will be no problem if they are not displayed. Therefore, as a general practice, after displaying the last picture of the temporally preceding encoded video data stream, the video decoder performs processing such as freezing the display, thereby masking the display of the pictures that failed to be decoded correctly.

In the prior art, even when the inter-frame predictive coded video data is edited without re-encoding, the header information is also edited so that a discrepancy does not occur between the two encoded video data stream spliced together. For example, in MPEG-4 AVC/H.264, POC (Picture Order Count) and FrameNum are appended to the slice header in order to maintain the inter-picture temporal relationship and identify the reference picture. POC indicates the relative display order of the picture. FrameNum is a value that increments by 1 each time the reference picture appears in the encoded video. Since POC values and FrameNum values need to be continuous between the spliced two encoded video data stream, there arises a need to edit all the POC values and FrameNum values in the encoded video data stream to be spliced on the downstream side of the temporally preceding encoded video data stream.

On the other hand, in the method disclosed in non-patent document JCTVC-J1003, "High-Efficiency Video Coding (HEVC) text specification Draft 8", Joint Collaborative Team on Video Coding of ITU-T SG16 WP3 and ISO/IEC JTC1/SC29/WG11, July 2012, FrameNum is abolished because a new method for identifying reference pictures has been introduced. Furthermore, since the POC value of the first picture of the encoded video data stream spliced on the downstream side need not have continuity with respect to the encoded video data stream spliced on the upstream side, there is no need to edit the slice header. In the method disclosed in the above non-patent document, a CRA (Clean Random Access) picture, a BLA (Broken Link Access) picture, a TFD (Tagged For Discard) picture, a DLP (Decodable Leading Picture) picture and a TP (Trailing Picture) picture have been introduced as new picture types in addition to the IDR (Instantaneous Decoding Refresh) picture defined in MPEG-4 AVC/H.264.

Of these pictures, the CRA picture and the BLA picture are both self-contained pictures, i.e., pictures that do not refer to any other pictures, so that pictures that follow the CRA picture or the BLA picture can be decoded correctly. When the video decoder starts decoding starting with a CRA picture, for example, any subsequent pictures other than the TFD picture that immediately follows the CRA picture can be decoded correctly.

The TFD picture is a picture that appears immediately following the CRA picture or the BLA picture, and that refers to a picture appearing earlier than the CRA picture or the BLA picture in time order and in decoding order. In the case of the non-closed GOP structure that conforms to MPEG-2, the plurality of B pictures immediately following the I picture at the head of the GOP each correspond to the TFD picture.

The BLA picture occurs as a result of editing of the encoded video data. Of the spliced two encoded video data streams, the encoded video data stream spliced on the downstream side generally begins with a CRA picture, but if this CRA picture appears partway through the spliced encoded video data, its picture type is changed from the CRA picture to the BLA picture. In the method disclosed in the above non-patent document, when the BLA picture appears, the POC values are permitted to become discontinuous. Further, the TFD picture that immediately follows this BLA picture is unable to be decoded correctly from any point in the spliced encoded video data because the picture to be referred to by it is lost from the spliced encoded video data. Therefore, the video encoder may delete from the encoded video data any TFD picture that follows the BLA picture at the head of the encoded video data stream to be spliced on the downstream side.

A DLP picture, like the TFD picture, is a picture that appears immediately following a CRA picture or BLA picture. Unlike the TFD picture, the DLP picture does not refer to a picture that precedes the CRA picture or BLA picture in both time order and decoding order. As a result, even if the decoding is started from the CRA picture or BLA picture, the DLP picture can be decoded correctly.

A TP picture is a picture that appears later than the CRA picture or BLA picture and the TFD and DLP pictures in decoding order, and that follows the CRA picture or BLA picture in time order. As a result, even if the decoding is started from the CRA picture or BLA picture, the TP picture can be decoded correctly.

SUMMARY

In the method disclosed in the above non-patent document, as in MPEG-4 AVC/H.264, the decode time and display time of each encoded picture are determined by using the parameters InitialCpbRemovalDelay, CpbRemovalDelay, and DpbOutputDelay. When splicing two encoded video data streams, the parameters CpbRemovalDelay and DpbOutputDelay of the picture after the splicing point need to be corrected to appropriate values in order to ensure continuous video decoding and display across the splicing point.

More specifically, the video encoder or the video decoder needs to correct the value of CpbRemovalDelay of the CRA picture at the head of the encoded video data stream spliced on the downstream side, based on the number of pictures that follow the last BPSEI-appended picture in the temporally preceding encoded video data stream. Furthermore, the video encoder or the video decoder increments the value of CpbRemovalDelay in order to ensure CPB buffer continuity. Further, when discarding the TFD picture in the encoded video data stream to be spliced on the downstream side, the video encoder or the video decoder needs to correct the value of CpbRemovalDelay of the picture to be decoded after the discarded TFD picture as well as the value of DpbOutputDelay of the first CRA picture after the splicing point.

Thus, in the method disclosed in the above non-patent document, there still exists a need to correct the contents of PTSEI when performing editing operations for splicing two encoded video data streams.

According to one embodiment, a video encoding apparatus for generating spliced encoded video data by splicing together first video data and second video data both encoded using inter-frame predictive coding is provided. The video encoding apparatus includes: a splicing point identification information processing unit which obtains decoding delay and display delay correction information for ensuring that even when one or more pictures that are later in encoding order than a starting encoded picture in the second video data to be spliced to a trailing end of the first encoded video data have been discarded from among pictures contained in the second video data, the starting encoded picture and subsequent pictures contained in the second encoded video data can be continuously decoded and displayed by a video decoding apparatus, and which appends the correction information to the spliced video data; and a data splicing unit which discards from the spliced video data any picture that is later in encoding order than the starting encoded picture and that is not guaranteed to be decoded correctly if decoding is started from the starting encoded picture. The correction information is calculated based on a decoding interval between each discarded picture and a picture that immediately precedes the discarded picture in decoding order.

According to another embodiment, a video decoding apparatus for decoding video data encoded by inter-frame predictive coding is provided. The video decoding apparatus includes: a picture decoding/display time determining unit which uses information indicating that the encoded video data has been generated by splicing second encoded video data to a trailing end of first encoded video data and information indicating that one or more encoded pictures that are later in encoding order than a starting encoded picture in the second encoded video data spliced downstream of a splicing point at which the first encoded video data and the second encoded video data are spliced have been discarded, and which corrects, based on correction information, a decoding delay for a picture that follows the starting encoded picture, while also correcting, based on the correction information, display delays for the starting encoded picture and the picture that follows the starting encoded picture. The correction information carries a value calculated based on a decoding interval between each picture that is later in decoding order than the starting encoded picture, and that has been discarded from the second encoded video data, and a picture that immediately precedes the discarded picture in decoding order.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Video encoding apparatus and video decoding apparatus according to various embodiments will be described below with reference to the drawings. When splicing two encoded video data streams without decoding them, the video encoding apparatus computes the values to be used for correcting the parameters indicating the decode time and display time of each picture appearing after the splicing point, and adds the values in the header information of each picture appearing after the splicing point. In this way, the video encoding apparatus eliminates the need to edit the parameters in the header of the original encoded video data when splicing two encoded video data streams.

In the present embodiments, the picture is a frame. However, the picture may not be limited to a frame, but may be a field. A frame refers to one complete still image in the video data, while a field refers to a still image obtained by extracting data only in the odd-numbered lines or even-numbered lines from one frame. The encoded video data may be color video data or monochrome video data.

First, referring to FIG. 2, the values of picture decoding delay CpbRemovalDelay and display delay DpbOutputDelay according to a first embodiment will be described by taking one picture coding structure as an example.

Figure 1:
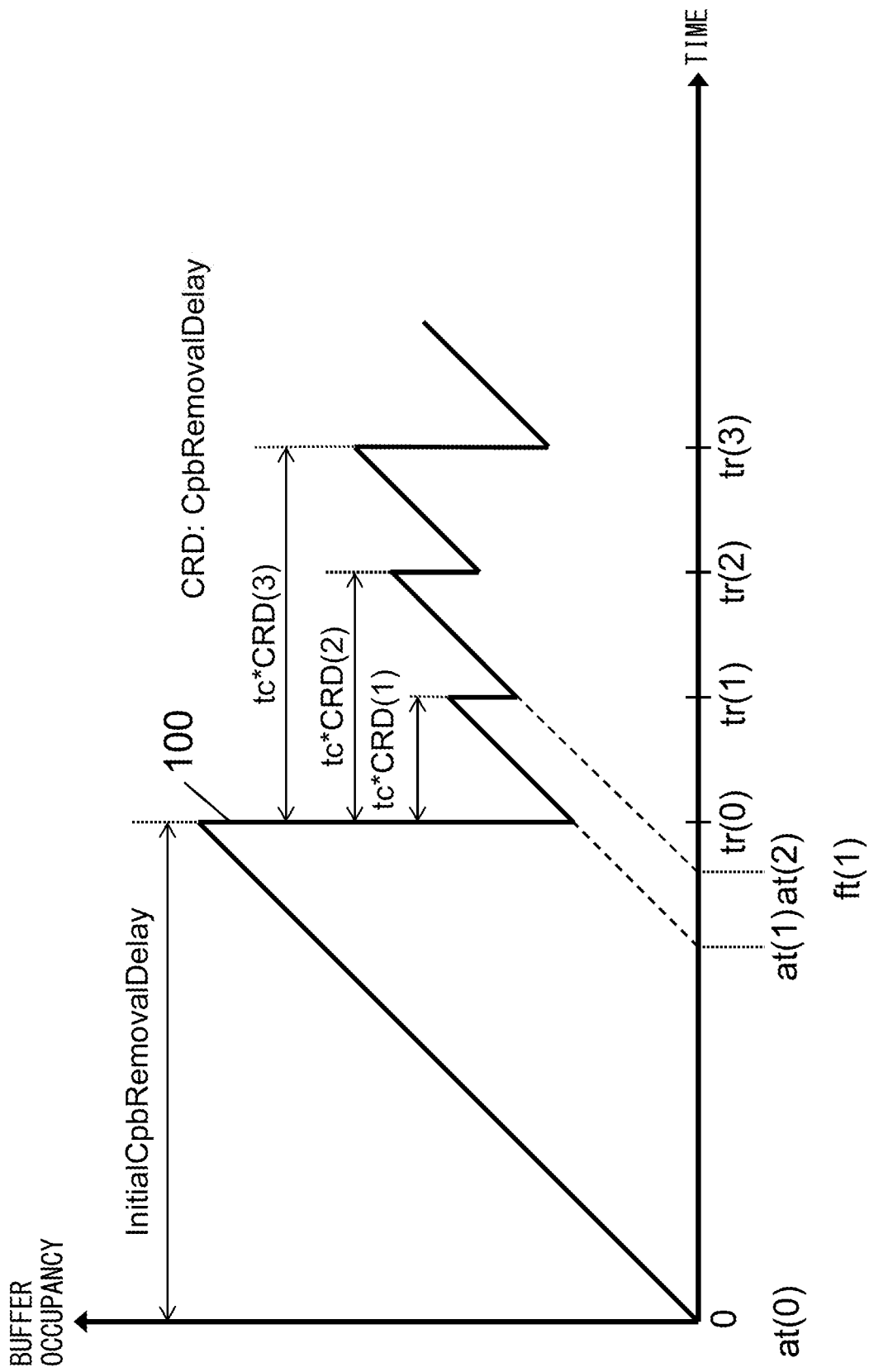
FIG. 1 is a diagram illustrating the relationship between the buffer occupancy of a receive buffer and the display time.
Figure 2:
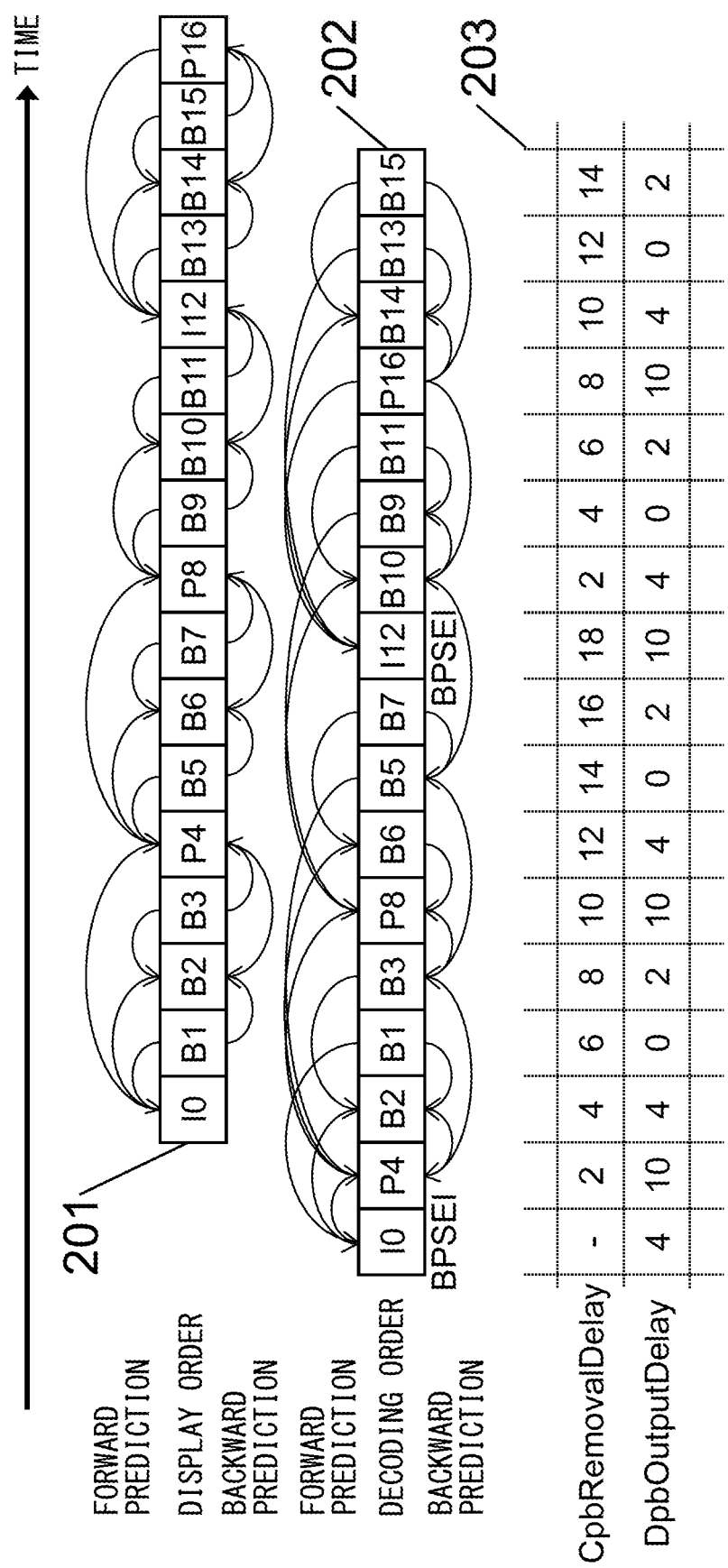
FIG. 2 is a diagram illustrating the relationship between the display order and decoding order of various pictures contained in video data and the decoding delay and display delay values of the respective pictures.

In FIG. 2, the picture coding structure 201 as one example of the picture coding structure contains a plurality of pictures. Each block in the picture coding structure 201 represents one picture. Of the two characters carried in the block corresponding to each picture, the alphabetic character at the left indicates the coding mode applied to that picture. The characters I, P, and B mean I picture, P picture, and B picture, respectively. Of the two characters carried in each block, the number at the right indicates the order of input to the video encoding apparatus. The input order coincides with the order in which the picture is output from the video decoding apparatus. Each arrow depicted above the picture coding structure 201 indicates the reference picture to which a picture to be encoded by forward frame prediction refers. For example, a picture P4 refers to a picture I0 that appears earlier than the picture P4. On the other hand, each arrow depicted below the picture coding structure 201 indicates the reference picture to which a picture to be encoded by backward frame prediction refers. For example, a picture B2 refers to the picture P4 that appears later than the picture B2.

The picture sequence presented below the picture coding structure 201 is the decoding order 202 of the pictures contained in the picture coding structure 201. Each block in the decoding order 202 represents one picture and, as in the case of the picture coding structure 201, the characters carried in the block indicate the coding mode and the order of input to the video encoding apparatus. The decoding order 202 coincides with the order of encoding performed by the video encoding apparatus. Each arrow depicted above the picture decoding order 202 and each arrow depicted below the picture decoding order 202 indicate, respectively, the reference picture to which a picture encoded by forward frame prediction refers and the reference picture to which a picture encoded by backward frame prediction refers.

In the decoding order 202, BPSEI is appended to each picture that carries the designation "BPSEI" thereunder. In the illustrated example, BPSEI is appended to every I picture. That is, for every I picture, the InitialCpbRemovalDelay parameter that indicates the difference between the time of arrival in the receive buffer of the first bit of the I picture and the decode time of the I picture is defined.

A block array 203 presented below the decoding order 202 indicates the values of CpbRemovalDelay and DpbOutputDelay carried in PTSEI appended to each picture. Each block in the upper row of the block array 203 carries the value of CpbRemovalDelay for the corresponding picture in the decoding order 202 located directly above that block. Likewise, each block in the lower row of the block array 203 carries the value of DpbOutputDelay for the corresponding picture in the decoding order 202 located directly above that block. CpbRemovalDelay corresponds to the order of encoding as counted from the most recent picture in the encoding order among the pictures to which BPSEI is appended. For example, a picture P8 is the fifth picture in the encoding order as counted from the picture I0. In the present embodiment, since each picture is a frame, and the inter-picture time interval tc is a value expressed in units of fields, the CpbRemovalDelay value of the picture P8 is given as 10 (=5*2).

On the other hand, DpbOutputDelay specifies the display delay that is needed in the video decoding apparatus to sequentially output the pictures in the correct order. For example, the DpbOutputDelay value of the picture P4 is 10. This is the delay needed to correctly display the picture B1 whose difference between the input order and the encoding order in the video encoding apparatus is the largest. That is, since the picture B1 is decoded with a delay of two pictures after the picture P4 is decoded, the display time of the picture P4 has to be further delayed by three picture times from the earliest time at which the picture B1 becomes ready for display, that is, the time at which the picture B1 is decoded. Since the difference between the decode time and display time of the picture P4 is equal to five picture times, and since tc is expressed in units of fields, the value of DpbOutputDelay is given as 10.

Figure 3:
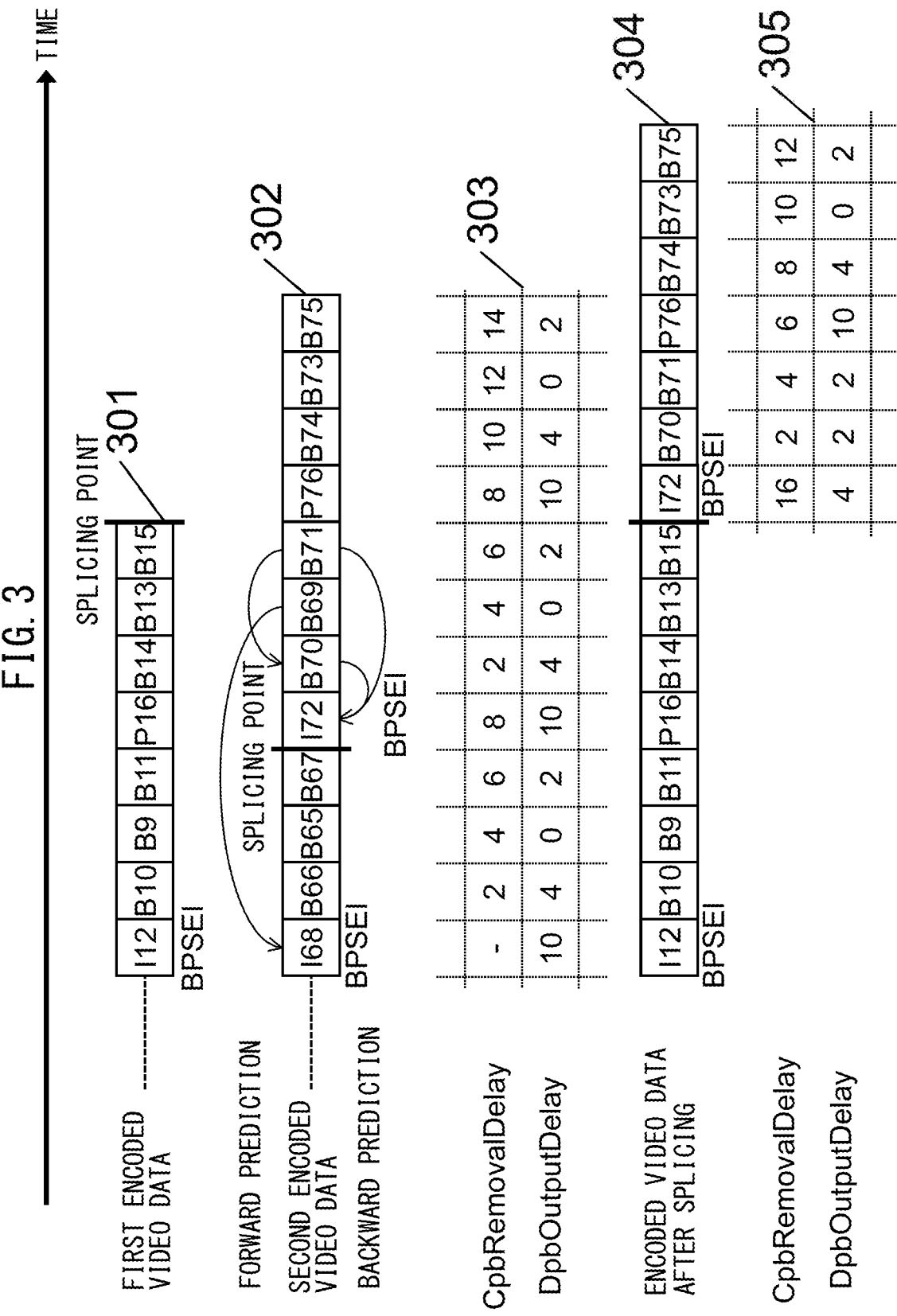
FIG. 3 is a diagram for explaining the decoding delay and display delay values of the pictures after the splicing point when two encoded video data streams are spliced.

Next, referring to FIG. 3, an explanation will be given of the values that, when two encoded video data streams are spliced, the decoding delay CpbRemovalDelay and display delay DpbOutputDelay of each picture in the encoded video data stream spliced downstream of the splicing point may take in order to eliminate any inconsistencies in decoding delay and display delay before and after the splicing point of the two encoded video data streams.

Each block in the first encoded video data stream 301 spliced upstream of the splicing point represents one picture, and the characters carried in the block indicate the coding mode and the order of input to the video encoding apparatus, as in the case of FIG. 2. In the illustrated example, the coding structure of the first encoded video data stream 301 is identical to the coding structure 201 depicted in FIG. 2.

In the illustrated example, the second encoded video data stream 302 is spliced immediately following the last picture B15 of the first encoded video data stream. In the second encoded video data stream 302 also, each block represents one picture, and the characters carried in each block indicate the coding mode and the order of input to the video encoding apparatus. Arrows depicted above the second encoded video data stream 302 indicate the reference pictures to which pictures B70, B69, and B71, respectively, refer when encoded by forward frame prediction. On the other hand, arrows depicted below the second encoded video data stream 302 indicate the reference pictures to which the pictures B70, B69, and B71, respectively, refer when encoded by backward frame prediction. The coding structure of the second encoded video data stream 302 is identical to the coding structure 201 depicted in FIG. 2, except for the pictures B70, B69, and B71. The encoding order of the pictures B70, B69, and B71 is the same as the encoding order of the bidirectional predicted pictures contained in the coding structure 201 depicted in FIG. 2. However, the reference pictures for the pictures B70, B69, and B71 are different from the reference pictures for the bidirectional predicted pictures contained in the coding structure 201. The pictures B70 and B71 each refer only to a picture later in display time, i.e., the picture I72. On the other hand, the picture B69 refers only to a picture earlier in display time, i.e., the picture I68. Such a situation occurs, for example, when there is a scene change between the pictures B69 and B70. Since the image changes abruptly across the scene change boundary, any bidirectional predicted picture located near the scene change boundary refers only to a picture located on the same side of the scene change boundary for better prediction efficiency. In the example given here, B69 is a TFD picture, and B70 and B71 are DLP pictures. In the illustrated example, the picture I72 and the subsequent pictures in the second encoded video data stream 302 are spliced so as to follow the picture B15 in the first encoded video data stream. The method disclosed in the non-patent document (JCTVC-J1003, "High-Efficiency Video Coding (HEVC) text specification Draft 8", Joint Collaborative Team on Video Coding of ITU-T SG16 WP3 and ISO/IEC JTC1/SC29/WG11, July 2012) imposes the conditions that the display time of a TFD picture be earlier than the display time of a DLP picture and that a DLP picture be not referred to from a TP picture.

A block array 303 presented below the second encoded video data stream 302 indicates the values of the decoding delay CpbRemovalDelay and display delay DpbOutputDelay carried in the PTSEI appended to each picture of the second encoded video data stream 302. Each block in the upper row of the block array 303 carries the value of the decoding delay CpbRemovalDelay for the corresponding picture in the second encoded video data stream 302 located directly above that block. Likewise, each block in the lower row of the block array 303 carries the value of the display delay DpbOutputDelay for the corresponding picture in the second encoded video data stream 302 located directly above that block.

Spliced encoded video data 304 generated by splicing the first and second encoded video data streams 301 and 302 is depicted below the block array 303. In the illustrated example, the picture B67 in the second encoded video data stream 302 and the pictures preceding the picture B67 in the encoding order are not contained in the spliced encoded video data 304. Further, the picture B69 is a TFD picture that refers to the encoded picture I68 that precedes the picture I72 in the encoding order. As a result, when the data is spliced at the picture I72, the picture B69 would become unable to be correctly reproduced. Therefore, the picture B69 is discarded when splicing the data. However, the picture B69 may not be discarded and may be retained in the spliced encoded video data. On the other hand, the pictures B70 and B71 are each a DLP picture that does not refer to a picture preceding the picture I72 in the encoding order, and can therefore be correctly reproduced. However, since the pictures B70 and B71 are pictures neither of which is referred to from the picture P76 or its subsequent pictures, if the pictures B70 and B71 were discarded simultaneously with the TFD picture 69, that would not affect the reproduction of the picture P76 and its subsequent pictures.

A block array 305 indicates the values of the decoding delay CpbRemovalDelay and display delay DpbOutputDelay that the pictures I72, B70, B71, P76, B74, B73, and B75 in the spliced encoded video data 304 are supposed to have. Each block in the upper row of the block array 305 carries the value of the decoding delay CpbRemovalDelay for the corresponding picture in the spliced encoded video data 304 located directly above that block. Likewise, each block in the lower row of the block array 305 carries the value of the display delay DpbOutputDelay for the corresponding picture in the spliced encoded video data 304 located directly above that block.

The decoding delay CpbRemovalDelay of the picture I72, after splicing, needs to be made to match the encoded picture interval relative to the picture I12 which is the picture having the immediately preceding BPSEI. In the illustrated example, since the picture I72 is the eighth picture in the encoding order as counted from the picture I12, the decoding delay CpbRemovalDelay is given as 16 (=8*2). The display delay DpbOutputDelay of the picture I72 needs also to be corrected so that the picture B73 to be decoded later than the picture I72 can be correctly displayed. The value of the display delay DpbOutputDelay of the picture I72 is different before and after the discarding of the picture B69. The value of the display delay DpbOutputDelay after the discarding of the picture B69 decreases by a value equal to the decoding interval which is defined by the difference between the decoding time of the discarded picture that is later in decoding order than I72 and the decoding time of the picture that immediately precedes the discarded picture in decoding order. In the illustrated example, the picture B69 is the discarded picture, and the decoding interval of B69 (i.e., the difference between the decoding time of B69 and the decoding time of the picture B70 immediately preceding it in decoding order) is 2; therefore, the value of the display delay DpbOutputDelay of the picture I72 is given as 2. Likewise, the display delay DpbOutputDelay of the picture B70 also decreases by a value equal to the decoding interval of the discarded picture that follows B70 in decoding order, i.e., by 2, and is thus given as 2.

The value of the decoding delay CpbRemovalDelay of each of the pictures B71, P76, B74, B73, and B75 is also different before and after the discarding of the picture B69. The value of the decoding delay CpbRemovalDelay of each of the pictures B71, P76, B74, B73, and B75 after the discarding of the picture B69 decreases from the original value of the decoding delay CpbRemovalDelay by a value equal to the decoding interval of the discarded picture that precedes the picture I72 in decoding order. In the illustrated example, the values of the decoding delay CpbRemovalDelay of the pictures B71, P76, B74, B73, and B75 are given as 4, 6, 8, 10, and 12, respectively, by subtracting the decoding interval, 2, of the TFD picture B69 from the original values of the decoding delay CpbRemovalDelay of the respective pictures. For the DLP picture B70, on the other hand, the value of CpbRemovalDelay remains unchanged after the discarding of the picture B69, since there is no discarded picture that precedes B70 in decoding order. The values of the display delay DpbOutputDelay of the pictures P76, B74, B73, and B75 also remain unchanged. Further, for any picture that was input later than the picture that would become the first CRA picture in the spliced encoded video data, neither the decoding delay CpbRemovalDelay nor the display delay DpbOutputDelay need be corrected.

As described above, when two encoded video data streams are spliced together, there arises a need at the time of decoding to correct the values of the decoding delay CpbRemovalDelay and display delay DpbOutputDelay for some of the pictures contained in the encoded video data stream spliced downstream of the splicing point. In the present embodiment, instead of correcting the values of the decoding delay CpbRemovalDelay and display delay DpbOutputDelay of the affected pictures contained in the original encoded video data before splicing, the video encoding apparatus adds in the header of the encoded video data the parameters that can be used to change the values of the decoding delay CpbRemovalDelay and display delay DpbOutputDelay to appropriate values when the video decoding apparatus decodes the spliced encoded video data.

Next, referring to FIG. 4, the structure of the encoded video data according to the first embodiment will be described that contains the parameters that can be used to change the values of the decoding delay CpbRemovalDelay and display delay DpbOutputDelay to appropriate values.

Figure 4:
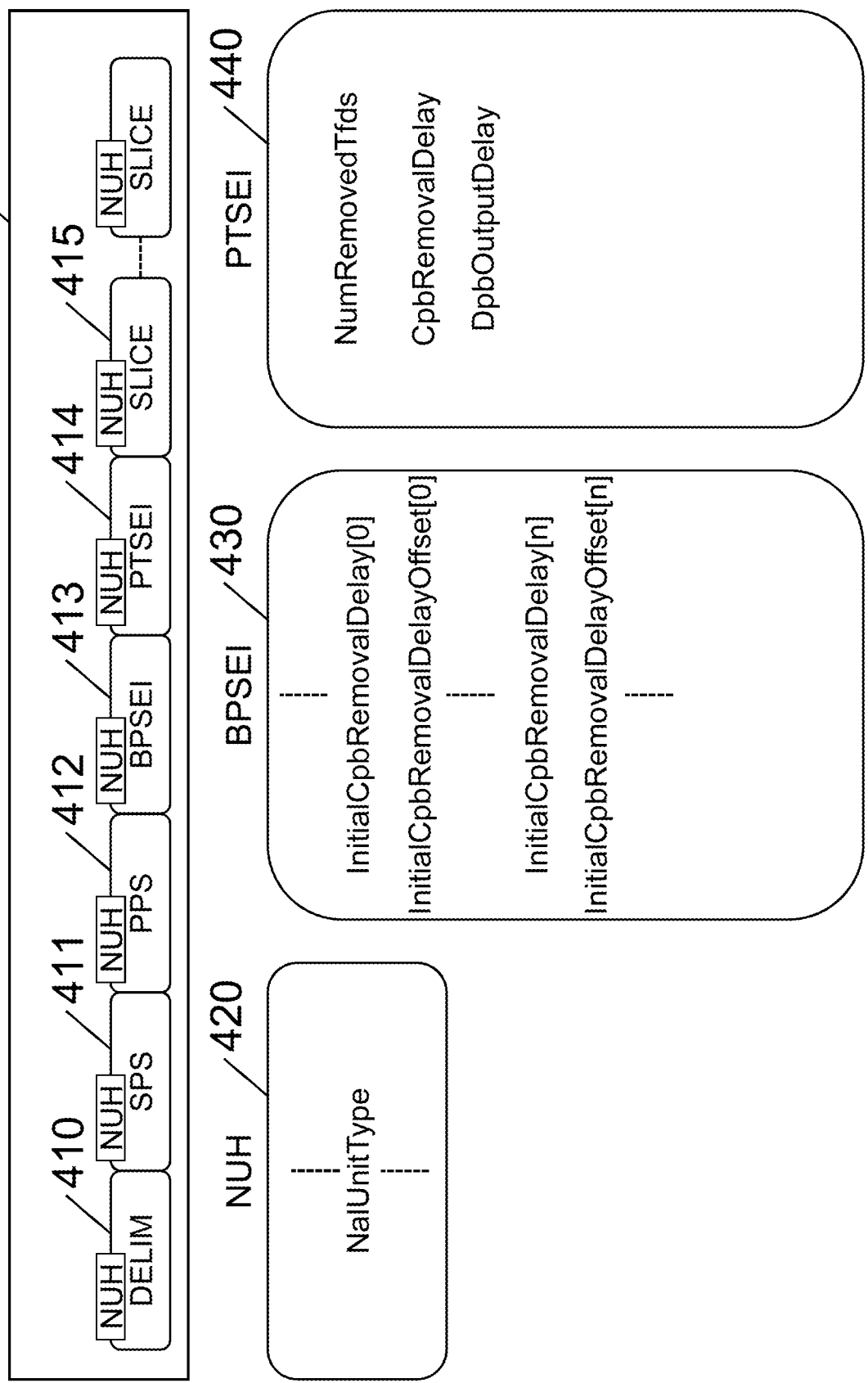
FIG. 4 is a diagram for explaining the data structure of one picture in encoded video according to a first embodiment.

As depicted in FIG. 4, the data structure 400 of one picture contains six kinds of network abstraction layer (NAL) units 410 to 415. These NAL units 410 to 415 conform to the NAL units defined in MPEG-4 AVC/H.264 and the method disclosed in the non-patent document (JCTVC-J1003, "High-Efficiency Video Coding (HEVC) text specification Draft 8", Joint Collaborative Team on Video Coding of ITU-T SG16 WP3 and ISO/IEC JTC1/SC29/WG11, July 2012). A header NUH 420 is appended to each NAL unit. The header NUH 420 contains a NalUnitType field that indicates the type of the NAL unit. When NalUnitType is 1 or 2, it indicates that the picture is a TP picture. When NalUnitType is 7, it indicates that the picture is a self-contained BLA picture immediately after which a TFD picture and a DLP picture may appear. When NalUnitType is 8, it indicates that the picture is a self-contained BLA picture immediately after which a DLP picture may appear. When NalUnitType is 9, it indicates that the picture is a self-contained BLA picture immediately after which neither a TFD picture nor a DLP picture appears. When NalUnitType is 12, it indicates that the picture is a self-contained CRA picture. When NalUnitType is 13, it indicates that the picture is a DLP picture. When NalUnitType is 14, it indicates that the picture is a TFD picture.

The NalUnitType value of each picture need not be limited to the above specific value, but may be set to some other suitable value.

The NAL units will be explained below.

The NAL unit 410 is a delimiter (DELIM) NAL unit and indicates a picture boundary.

The NAL unit 411 is a sequence parameter set (SPS) NAL unit which carries a set of parameters common to the entire sequence of the encoded video. The NAL unit 411 is appended to a self-contained picture.

The NAL unit 412 is a picture parameter set (PPS) NAL unit which carries a set of parameters common to a plurality of encoded pictures. The PPS NAL unit 412 is appended to a self-contained picture, and may sometimes be appended to other types of picture.

The NAL unit 413 is a BPSEI NAL unit which is appended only to a self-contained picture. In the present embodiment, the parameters to be used by the video decoding apparatus to correct the decoding delay and display delay of each picture appearing after the splicing point are added in this NAL unit 413.

The NAL unit 414 is a PTSEI NAL unit which is appended to every picture.

The NAL unit 415 is a slice (SLICE) NAL unit which is the substance of the encoded picture.

The BPSEI NAL unit 413 according to the present embodiment contains a number, (N+1), of InitialCpbRemovalDelay/InitialCpbRemovalDelayOffset field pairs (where N is an integer not smaller than 0). The definition of these field may be the same as that given in the method disclosed in the earlier cited non-patent document (JCTVC-J1003, "High-Efficiency Video Coding (HEVC) text specification Draft 8", Joint Collaborative Team on Video Coding of ITU-T SG16 WP3 and ISO/IEC JTC1/SC29/WG11, July 2012) or in MPEG-4 AVC/H.264.

The reason that there is more than one InitialCpbRemovalDelay/InitialCpbRemovalDelayOffset field pair is to describe the InitialCpbRemovalDelay and InitialCpbRemovalDelayOffset parameters suitable for the case where the encoded bit stream is transmitted at (N+1) different bit rates. The InitialCpbRemovalDelayOffset parameter defines the difference between the encoding completion time of the first picture in the video encoding apparatus and the start time of the transmission of the encoded picture data to the video decoding apparatus.

The PTSEI NAL unit 414 contains a decoding delay CpbRemovalDelay field, a display delay DpbOutputDelay field, and a NumRemovedTfds field. The NumRemovedTfds field is one example of correction information used for the correction of the decoding delay and display delay. The NumRemovedTfds field carries the sum of the decoding intervals of the pictures discarded during the interval between the PTSEI-appended picture and the next BPSEI-appended picture in decoding order. The decoding interval of a picture is defined as the value obtained by subtracting, from the CpbRemovalDelay field value carried in the PTSEI appended to the picture, the CpbRemovalDelay field value carried in the PTSEI appended to the picture immediately preceding in decoding order. When the picture immediately preceding in decoding order is a BLA picture, the CpbRemovalDelay field value carried in the PTSEI appended to the BLA picture is treated as 0. When the encoded bit stream is generated, the NumRemovedTfds field value is set to 0.

Figure 5:
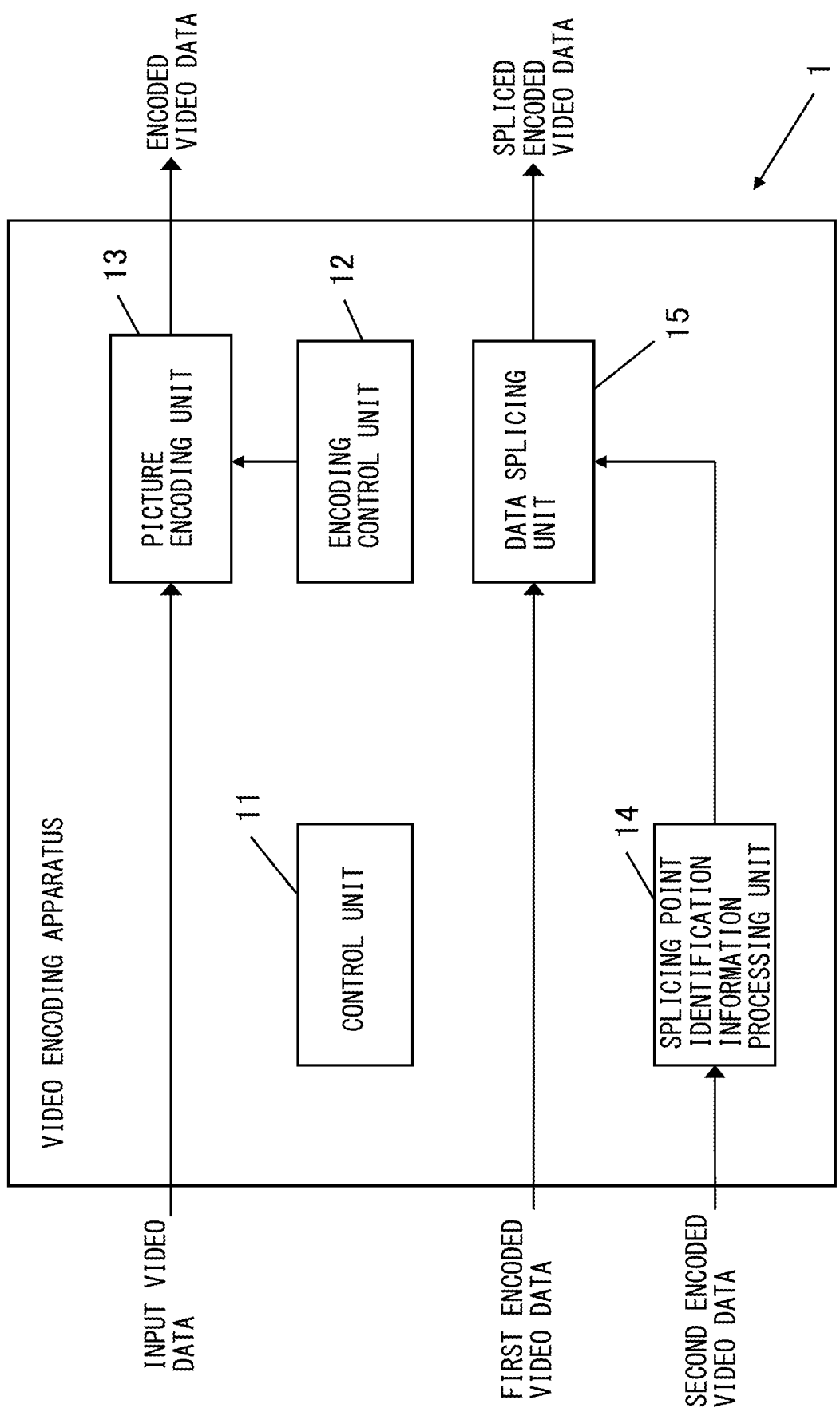
FIG. 5 is a simplified block diagram of a video encoding apparatus according to the first embodiment.

FIG. 5 is a simplified block diagram of the video encoding apparatus according to the first embodiment. The video encoding apparatus 1 includes a control unit 11, an encoding control unit 12, a picture encoding unit 13, a splicing point identification information processing unit 14, and a data splicing unit 15. These units constituting the video encoding apparatus 1 are each implemented as a separate circuit on the video encoding apparatus 1. Alternatively, these units constituting the video encoding apparatus 1 may be implemented on the video encoding apparatus 1 in the form of a single integrated circuit on which the circuits implementing the functions of the respective units are integrated. Further, these units constituting the video encoding apparatus 1 may be functional modules implemented by executing a computer program on a processor incorporated in the video encoding apparatus 1.

The control unit 11 controls the operation of each designated unit of the video encoding apparatus 1 when encoding the video data or when editing the encoded video data. For example, based on the nature of the video data such as the scene change position, etc., and the reproduced image quality, compression ratio, etc. needed of the encoded video data, the control unit 11 determines the GOP structure, etc. that are applied to the video data to be encoded. Then, the control unit 11 signals the GOP structure, etc. to the encoding control unit 12.

First, a video encoding process for encoding the video data will be described. The video encoding process is carried out using the encoding control unit 12 and the picture encoding unit 13.

The encoding control unit 12 determines the encoding order, the coding mode (for example, intra-coding, forward prediction, or bidirectional prediction), etc. for each picture in accordance with the GOP structure signaled from the control unit 11. Then, based on the coding mode, the position within the GOP structure, etc. of each picture, the encoding control unit 12 determines the CRA picture insertion interval, the number of pictures to be reordered at the time of encoding, and the maximum display delay. In the example illustrated in FIG. 2, the CRA picture insertion interval is 12, the number of pictures to be reordered is 2, and the maximum display delay is 5. The encoding control unit 12 generates the header information of each picture based on these values.

For example, if the picture type is the I picture (CRA picture) which is encoded without referring to any other picture, and if the picture is not the starting picture of the encoded video data, the encoding control unit 12 sets NalUnitType in the NUH 420 of each slice of the picture to 12. NalUnitType in the NUH 420 of each slice of the starting picture of the encoded video data is set to 10 (IDR picture). Further, when the number of pictures to be reordered is not smaller than 1, the encoding control unit 12 sets NalUnitType to 14 (TFD picture) for a picture that immediately follows the CRA picture and that refers to a picture that is earlier in both decoding order and display order than the CRA picture. On the other hand, for a picture that immediately follows the CRA picture and that does not refer to any picture that precedes the CRA picture in display time and that is earlier in both decoding order and display order than the CRA picture, the encoding control unit 12 sets NalUnitType to 13 (DLP picture). For the other pictures, the encoding control unit 12 sets NalUnitType to 1 or 2 (TP picture).

The encoding control unit 12 notifies the picture encoding unit 13 of the value of NalUnitType that has been set in the header NUH 420 of each slice of the picture to be encoded. Further, the encoding control unit 12 obtains the values of the decoding delay CpbRemovalDelay and display delay DpbOutputDelay in the PTSEI of each picture from the picture prediction structure, as shown in FIG. 2, and notifies the picture encoding unit 13 accordingly.

When NalUnitType in the NUH 420 of each slice of the picture is 10 or 12, the encoding control unit 12 appends BPSEI to that picture.

For each picture, the encoding control unit 12 signals the coding mode and the header information of the picture to the picture encoding unit 13, and issues an instruction to encode the picture.

The picture encoding unit 13, in response to the instruction from the encoding control unit 12, encodes the picture with the specified coding mode by employing one of video coding methods capable of inter-frame predictive coding. The video coding method that the picture encoding unit 13 employs may be, for example, MPEG-4 AVC/H.264 or MPEG-2. The picture encoding unit 13 stores the encoded video data, containing each encoded picture, in a storage unit (not depicted).

Next, an editing process performed when splicing two encoded video data streams will be described. The editing process is carried out using the splicing point identification information processing unit 14 and the data splicing unit 15.

The splicing point identification information processing unit 14 reads out from a storage unit (not depicted) the two encoded video data streams selected, for example, via a user interface unit (not depicted). Then, in accordance with an externally applied control signal (not depicted), the splicing point identification information processing unit 14 identifies the splicing point starting picture in the second encoded video data stream to be spliced temporally downstream of the other one of the encoded video data streams. The external control signal specifies, for example, the number of encoded pictures as counted from the beginning of the second encoded video data stream, and the splicing point identification information processing unit 14 identifies, for example, the latest CRA picture within this number of encoded pictures as being the splicing point picture.

For the splicing point CRA picture thus identified, if the number of pictures to be reordered is not smaller than 1, the splicing point identification information processing unit 14 changes the value of the NalUnitType of each slice of that picture from 12 to 7 which indicates that the picture is a BLA picture that may potentially be followed by a TFD picture. This NalUnitType value indicates that the two encoded video data streams has been spliced together at that splicing point, and also that one or more encoded pictures later than the splicing point BLA picture in both encoding order and decoding order have been discarded. Further, the splicing point identification information processing unit 14 supplies the splicing point CRA picture and its subsequent pictures in the second encoded video data stream to the data splicing unit 15, and issues an instruction to discard the TFD picture immediately following the splicing point CRA picture. On the other hand, if the number of pictures to be reordered is 0, the splicing point identification information processing unit 14 changes the value of the NalUnitType of each slice of the splicing point CRA picture from 12 to 9 which indicates that the picture is a BLA picture immediately after which neither a TFD picture nor a DLP picture appears.

Next, the splicing point identification information processing unit 14 calculates the decoding interval of the TFD picture to be discarded, and the value of the NumRemovedTfds field of a non-TFD picture immediately preceding the TFD picture to be discarded is incremented by a value equal to the decoding interval of the discarded TFD picture that follows the non-TFD picture. When the decoding interval of each picture is equal, the value of the NumRemovedTfds field of the non-TFD picture will eventually represent the number of discarded pictures in units of fields that follow the non-TFD picture in decoding order. Then, the splicing point identification information processing unit 14 corrects the value of the NumRemovedTfds field of the PTSEI appended to any picture that precedes in decoding order the TFD picture to be discarded in the second encoded video data stream.

The data splicing unit 15 receives the second encoded video data stream from the splicing point identification information processing unit 14, and splices it to the trailing end of the first encoded video data stream that is spliced temporally upstream of the splicing point. At this time, the data splicing unit 15 discards any TFD picture that immediately follows the starting picture in the second encoded video data stream and that is not guaranteed to be decoded correctly. In this case, the data splicing unit 15 may also discard a DLP picture by regarding it as a TFD picture. Then, the data splicing unit 15 stores in the storage unit (not depicted) the spliced encoded video data created by splicing together the first and second encoded video data streams.

Figure 6:
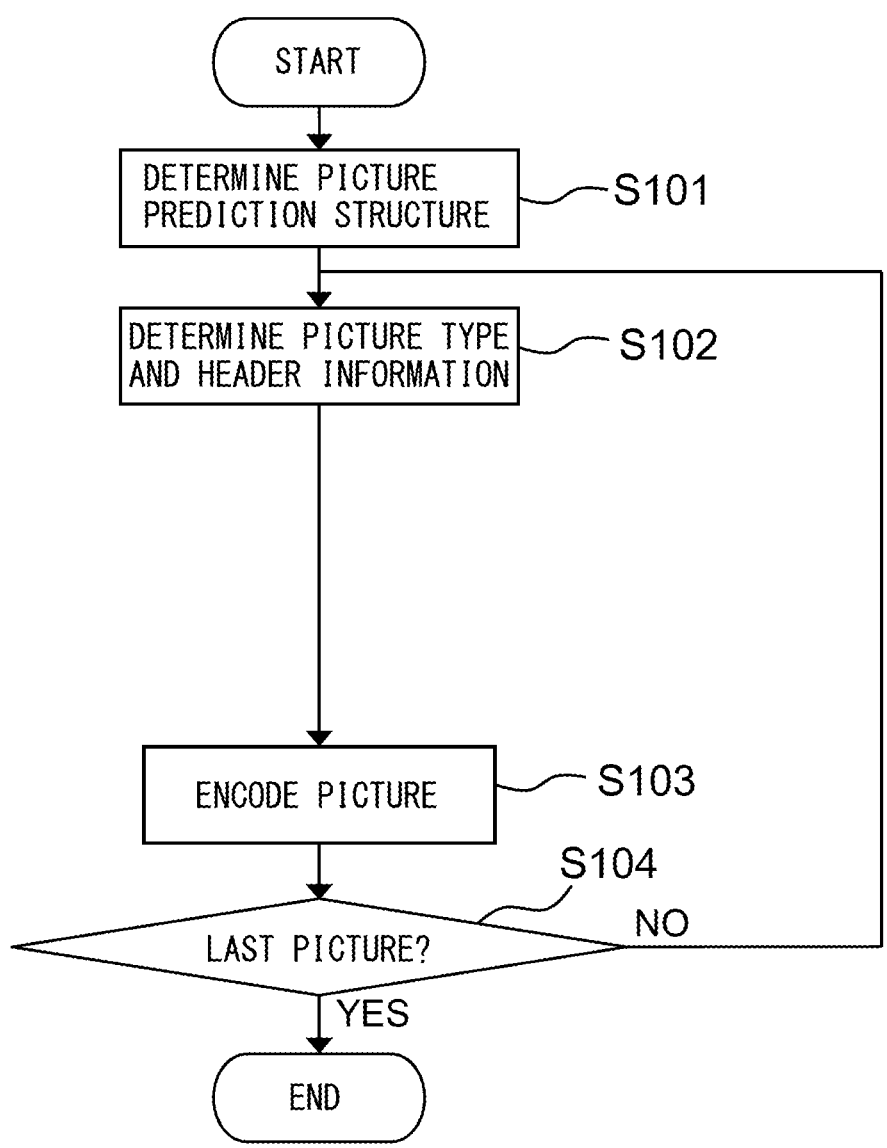
FIG. 6 is an operation flowchart of a video encoding process according to the first embodiment.

FIG. 6 is an operation flowchart illustrating the video encoding process performed by the video encoding apparatus according to the first embodiment. The video encoding apparatus 1 encodes the entire video sequence in accordance with the operation flowchart of FIG. 6.

Before starting the encoding process for the entire sequence, the picture prediction structure such as the GOP structure is determined, for example, by the control unit 11 (step S101). The picture prediction structure determined is signaled to the encoding control unit 12.

Then, based on the picture prediction structure, the position of the target picture from the beginning of the video data, etc., the encoding control unit 12 determines the coding mode to be applied to encode the target picture, and generates the header information of the target picture to be encoded (step S102).

After step S102, the encoding control unit 12 supplies the data of the target picture to the picture encoding unit 13 along with the type of the coding mode and the header information of that picture. Then, the picture encoding unit 13 encodes the target picture in accordance with the coding mode and the header information, and appends the header information to the data of the encoded picture (step S103).

After that, the control unit 11 determines whether there is any picture remaining to be encoded in the video sequence (step S104). If there is any picture remaining to be encoded (Yes in step S104), the control unit 11 carries out the process from step S102 onward to encode the next target picture. On the other hand, if there is no longer any picture remaining to be encoded (No in step S104), the control unit 11 terminates the encoding process.

Figure 7:
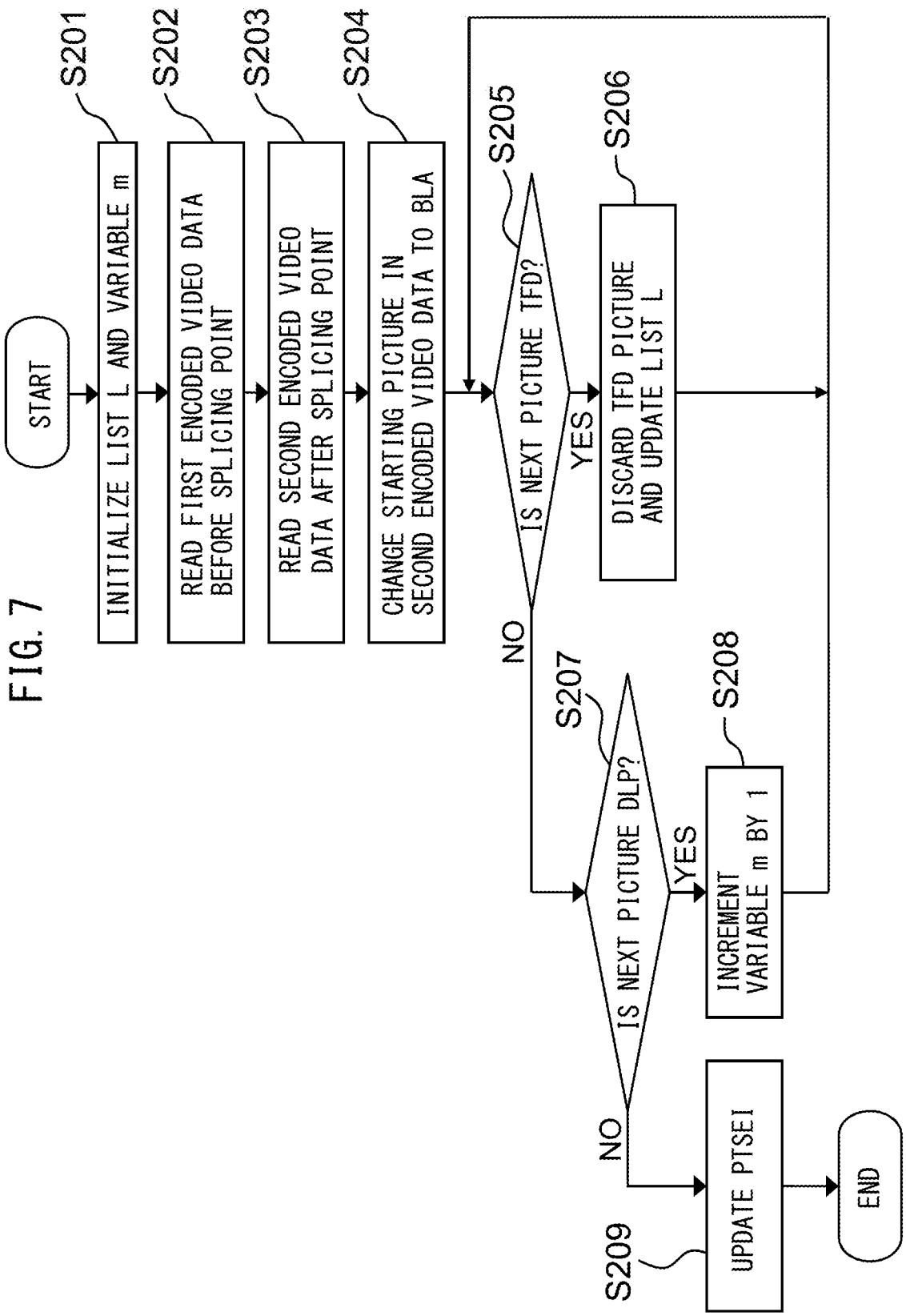
FIG. 7 is an operation flowchart of a video editing process according to the first embodiment.

FIG. 7 is an operation flowchart illustrating the video editing process performed by the video encoding apparatus according to the first embodiment. In the illustrated example, DLP pictures are not discarded, but only TFD pictures are discarded.

The splicing point identification information processing unit 14 initializes a list L[ ] of pictures that are not discarded among the TFD and DLP pictures, and initializes to 2 a variable m that represents the value obtained by adding 2 to the number of pictures not discarded (step S201). If there is no TFD picture that follows the last DLP picture in decoding order, the variable m may be set to represent the number of pictures not discarded among the TFD and DLP pictures.

Next, the splicing point identification information processing unit 14 sequentially reads out from the storage unit (not depicted) the encoded pictures up to the splicing point out of the first encoded video data stream to be spliced upstream of the splicing point (step S202).

Further, the splicing point identification information processing unit 14 sequentially reads out from the storage unit (not depicted) the encoded pictures after the splicing point out of the second encoded video data stream to be spliced downstream of the splicing point (step S203). Next, for the starting CRA picture read out of the second encoded video data stream, the splicing point identification information processing unit 14 changes the value of NalUnitType in each slice NUH to the value that indicates a BLA picture (step S204).

Next, the splicing point identification information processing unit 14 determines whether the value of NalUnitType of the next picture in decoding order is 14 or not, that is, whether the next picture is a TFD picture or not (step S205). If the picture is a TFD picture (Yes in step S205), the splicing point identification information processing unit 14 issues an instruction to the splicing unit 15 to discard the TFD picture, and adds the decoding interval of that TFD picture, i.e., the difference in PTSEI CpbRemovalDelay value between that TFD picture and the picture immediately preceding it in decoding order, to each of the 0th to mth entries in the list [ ] (step S206). After that, the splicing point identification information processing unit 14 returns to step S205 to evaluate the NalUnitType of the next picture.

On the other hand, if the picture is not a TFD picture (No in step S205), the splicing point identification information processing unit 14 determines whether the value of NalUnitType of the next picture in decoding order is 13 or not, i.e., whether the next picture is a DLP picture or not (step S207). If the next picture is a DLP picture (Yes in step S207), the splicing point identification information processing unit 14 increments the variable m by 1 (step S208). After that, the splicing point identification information processing unit 14 returns to step S205 to repeat the above process. On the other hand, if the next picture in decoding order is not a DLP picture (No in step S207), the next picture is neither a TFD picture nor a DLP picture, but is a TP picture. There is no TFD picture that follows the TP picture in decoding order. Therefore, based on the list L[ ], the splicing point identification information processing unit 14 updates the NumRemovedTfds field of the PTSEI appended to each of the BLA and DLP pictures (step S209). More specifically, for the non-TFD pictures up to the mth picture in the decoding order as counted from the BLA picture, the splicing point identification information processing unit 14 updates the value of the NumRemovedTfds field of the PTSEI appended to the kth picture to L[k]. After that, the splicing point identification information processing unit 14 supplies the BLA picture and its subsequent pictures to the data splicing unit 15.

The splicing unit 15 splices the BLA picture and its subsequent pictures in the second encoded video data stream so as to follow the last picture of the first encoded video data stream upstream of the splicing point. At this time, the splicing unit 15 discards the TFD pictures specified by the splicing point identification information processing unit 14 to be removed.

Next, a description will be given of the video decoding apparatus for decoding the encoded video data encoded or edited by the video encoding apparatus 1 according to the first embodiment.

Figure 8:
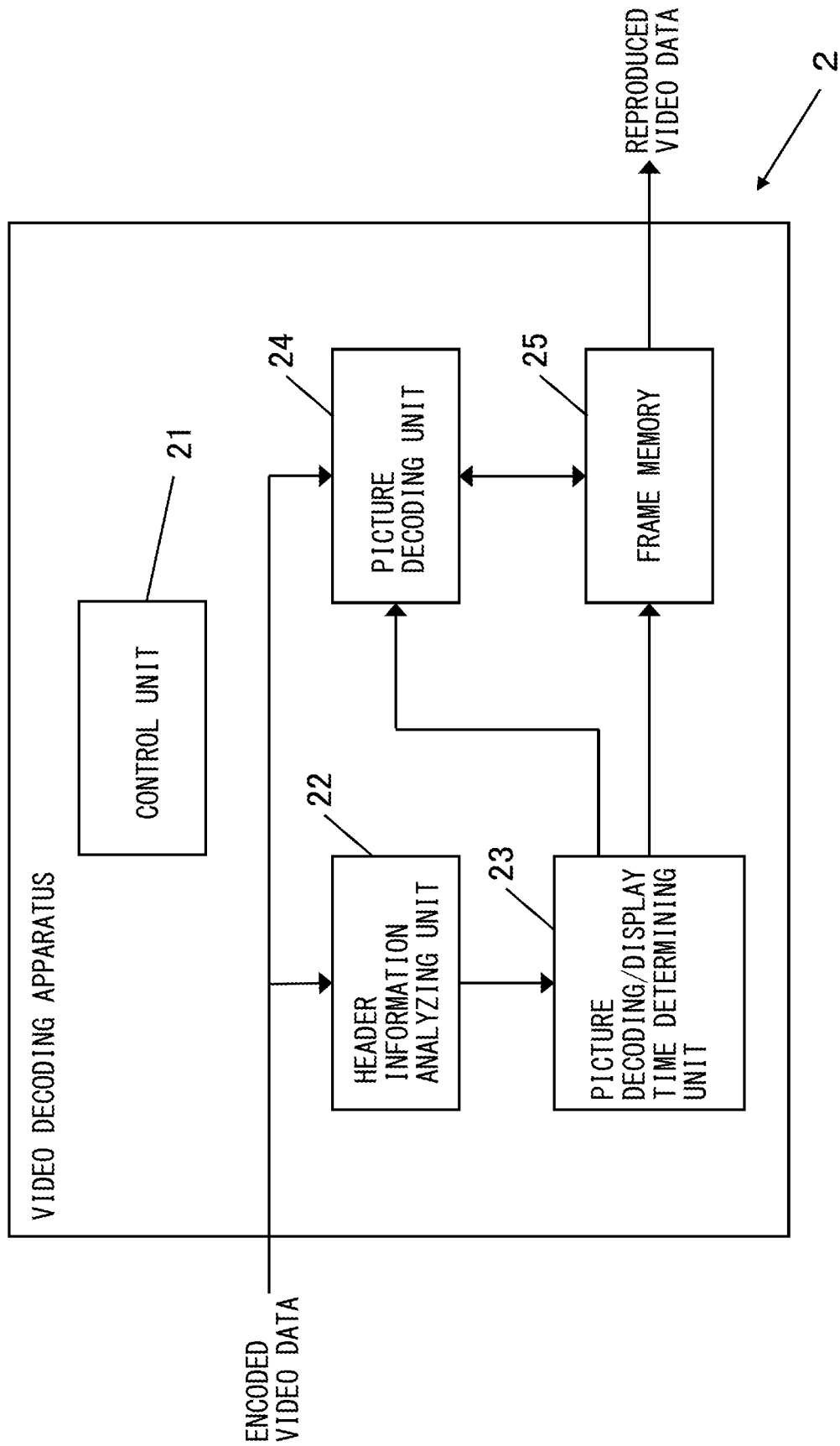
FIG. 8 is a simplified block diagram of a video decoding apparatus according to the first embodiment.

FIG. 8 is a simplified block diagram of the video decoding apparatus according to the first embodiment. The video decoding apparatus 2 includes a control unit 21, a header information analyzing unit 22, a picture decoding/display time determining unit 23, a picture decoding unit 24, and a frame memory 25. These units constituting the video decoding apparatus 2 are each implemented as a separate circuit on the video decoding apparatus 2. Alternatively, these units constituting the video decoding apparatus 2 may be implemented on the video decoding apparatus 2 in the form of a single integrated circuit on which the circuits implementing the functions of the respective units are integrated. Further, these units constituting the video decoding apparatus 2 may be functional modules implemented by executing a computer program on a processor incorporated in the video decoding apparatus 2.

The control unit 21 controls the operation of each designated unit of the video decoding apparatus 2 when decoding the encoded video data.

The header information analyzing unit 22 analyzes the header information of the encoded video data, and passes the parameters necessary for the determination of the picture decoding and display times, for example, NalUnitType of each picture and CpbRemovalDelay, DpbOutputDelay, and NumRemovedTfds carried in PTSEI, to the picture decoding/display time determining unit 23.

The picture decoding/display time determining unit 23 that received the parameters from the header information analyzing unit 22 checks the slice NUH of the picture to be decoded. When the value of NalUnitType carried in the NUH is 7 or 8 or 9, the picture decoding/display time determining unit 23 determines that the picture to be decoded is a BLA picture.

When the picture to be decoded is a BLA picture, the picture decoding/display time determining unit 23 uses, as the decoding delay CpbRemovalDelay of the BLA picture, the value calculated in the following manner, not the value of the CpbRemovalDelay carried in the PTSEI appended to the BLA picture.

The picture decoding/display time determining unit 23 calculates the sum A of picture decoding intervals counted from the picture that immediately follows the most recent BPSEI-appended picture before the BLA picture up to the BLA picture. Then, the picture decoding/display time determining unit 23 sets the decoding delay CpbRemovalDelay of the BLA picture equal to A. When the decoding interval of each picture is equal, the picture decoding/display time determining unit 23 may set the decoding delay CpbRemovalDelay of the BLA picture equal to the number of pictures counted in units of fields from the picture immediately following the most recent BPSEI-appended picture before the BLA picture up to the BLA picture.

Further, the picture decoding/display time determining unit 23 checks the NumRemovedTfds field of the PTSEI appended to the BLA picture. If the value of NumRemovedTfds is not zero, the picture decoding/display time determining unit 23 determines that the TFD picture immediately following the BLA picture has been discarded, and corrects the display delay CpbRemovalDelay of the BLA picture by subtracting the value of NumRemovedTfds from the value of the display delay CpbRemovalDelay of the BLA picture.

The picture decoding/display time determining unit 23 further performs the following processing on every picture that follows the BLA picture in decoding order until the next BPSEI-appended picture appears.

For every designated picture, the picture decoding/display time determining unit 23 corrects the decoding delay CpbRemovalDelay by subtracting from the original value of CpbRemovalDelay the difference between the value of NumRemovedTfds carried in the PTSEI appended to the BLA picture and the value of NumRemovedTfds carried in the PTSEI appended to the designated picture (i.e., the sum of the decoding intervals of the discarded pictures that occurred after the designated picture). Further, for every designated picture, the picture decoding/display time determining unit 23 corrects the display delay DpbOutputDelay by subtracting from the original value of DpbOutputDelay the value of NumRemovedTfds carried in the PTSEI appended to the designated picture.

Further, for every TP picture, the picture decoding/display time determining unit 23 corrects the decoding delay CpbRemovalDelay by subtracting from the original value of the decoding delay CpbRemovalDelay of that picture the value of NumRemovedTfds carried in the PTSEI appended to the BLA picture.

For any other picture than the above pictures, the picture decoding/display time determining unit 23 determines the decoding delay CpbRemovalDelay and display delay DpbOutputDelay of the picture by directly taking the values of CpbRemovalDelay and DpbOutputDelay carried in the PTSEI appended to that picture.

The picture decoding/display time determining unit 23 determines the decoding time of each picture based on the above decoding delay CpbRemovalDelay, and issues a decoding instruction to the picture decoding unit 24 at the determined decoding time. Further, the picture decoding/display time determining unit 23 determines the display time of each picture based on the above display delay DpbOutputDelay, and issues a display instruction to the frame memory 25 at the determined display time.

Upon receiving the decoding instruction for the picture to be decoded, the picture decoding unit 24 decodes the picture by using a reference picture stored in the frame memory 25. Then, the picture decoding unit 24 stores the decoded picture in the frame memory 25. The picture decoding unit 24 performs the decoding by employing the same coding method as that employed by the picture encoding unit in the video encoding apparatus 1.

The frame memory 25 stores the decoded picture. Further, the frame memory 25 outputs the decoded picture to the picture decoding unit 24 to present a reference picture to a picture to be decoded subsequently. The frame memory 25 also outputs the decoded picture to a display unit (not depicted) in accordance with the display instruction received from the picture decoding/display time determining unit 23.

Figure 9:
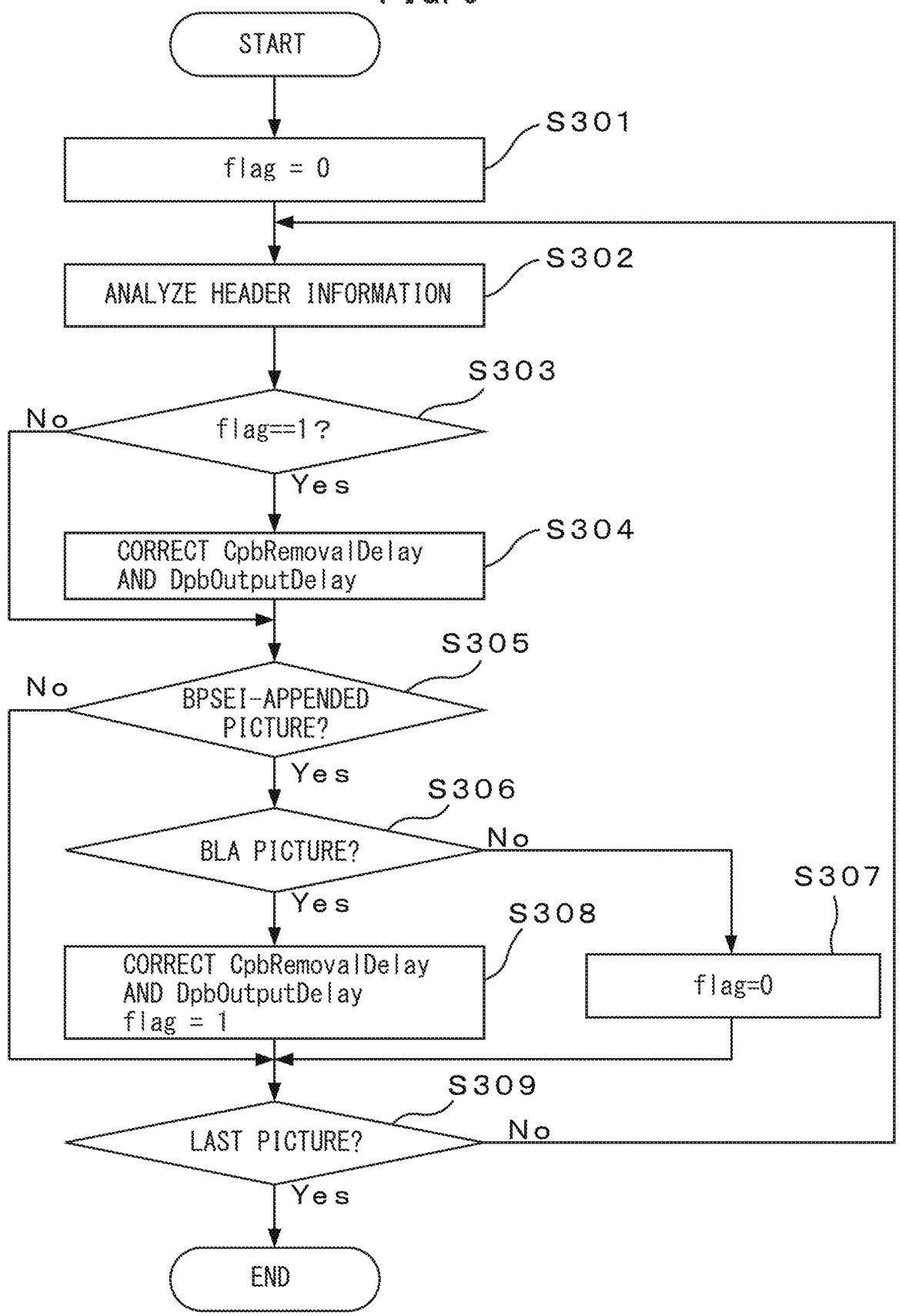
FIG. 9 is an operation flowchart of a video decoding process according to the first embodiment.

FIG. 9 is an operation flowchart illustrating the video decoding process performed by the video decoding apparatus according to the first embodiment. The video decoding apparatus 2 decodes the entire video sequence in accordance with the operation flowchart of FIG. 9.

Before starting the decoding process for the entire sequence, the control unit 21 initializes a variable "flag" to 0 (step S301). The variable "flag" is a variable that indicates whether the picture is a non-BLA picture whose CpbRemovalDelay and DpbOutputDelay need correcting. If the flag is 1, CpbRemovalDelay and DpbOutputDelay need correcting, and if the flag is 0, neither CpbRemovalDelay nor DpbOutputDelay need correcting.

Next, the header information analyzing unit 22 analyzes the header information of the picture to be decoded, and passes the parameters necessary for determining the decoding time and display time of the picture to the picture decoding/display time determining unit 23 (step S302). The picture decoding/display time determining unit 23 determines whether the variable "flag" is 1 or not (step S303). If the variable "flag" is 1 (Yes in step S303), the picture decoding/display time determining unit 23 corrects the decoding delay CpbRemovalDelay of the picture to be decoded, which is, in this case, a non-BLA picture, by using the NumRemovedTfds of the picture to be decoded and the NumRemovedTfds of the most recent BLA picture (step S304). The picture decoding/display time determining unit 23 also corrects the display delay DpbOutputDelay of the picture to be decoded, by using the NumRemovedTfds of the picture to be decoded.

After step S304, or after it is determined in step S303 that the variable "flag" is 0 (No in step S303), the picture decoding/display time determining unit 23 proceeds to determine whether the picture to be decoded is a BPSEI-appended picture or not (step S305).

If the picture to be decoded is a BPSEI-appended picture (Yes in step S305), the picture decoding/display time determining unit 23 determines whether the picture to be decoded is a BLA picture or not (step S306). If the picture to be decoded is not a BLA picture (No step S306), the picture decoding/display time determining unit 23 resets the variable "flag" to 0 (step S307).

If the picture to be decoded is a BLA picture (Yes in step S306), the picture decoding/display time determining unit 23 corrects the decoding delay CpbRemovalDelay and display delay DpbOutputDelay of the picture, and sets the variable "flag" to 1 (step S308). In this case, the picture decoding/display time determining unit 23 determines the decoding delay CpbRemovalDelay of the BLA picture by taking the sum of picture decoding intervals counted from the picture that immediately follows the most recent BPSEI-appended picture up to the BLA picture. Further, the picture decoding/display time determining unit 23 determines the display delay DpbOutputDelay of the picture by subtracting the value of NumRemovedTfds from the original value of DpbOutputDelay.

After step S307 or S308, or after it is determined in step S305 that the picture to be decoded is not a BPSEI-appended picture (No in step S305), the control unit 21 proceeds to determine whether there is any picture remaining to be decoded in the encoded video data (step S309). If there is any picture remaining to be decoded (Yes in step S309), the control unit 21 returns the process to step S302. Then, the picture to be decoded next in decoding order is taken as the target picture, and the process starting from step S302 is repeated. On the other hand, if there is no longer any picture remaining to be decoded (No in step S309), the control unit 21 terminates the video decoding process.

Figure 10:
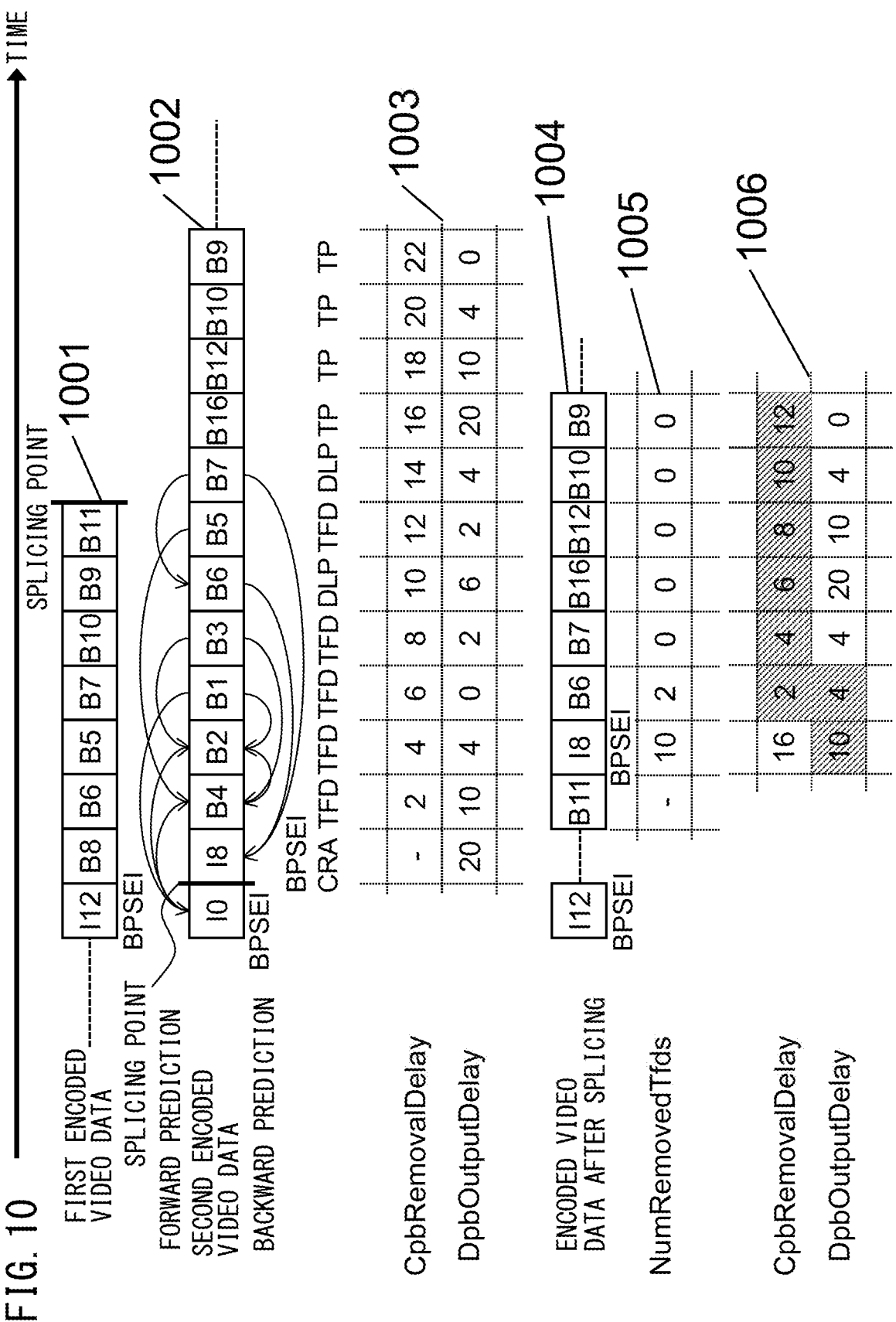
FIG. 10 is a diagram for explaining the decoding delay and display delay values of the pictures after the splicing point when two encoded video data streams are spliced according to a second embodiment.

The method of deriving NumRemovedTfds and the method of correcting CpbRemovalDelay and DpbOutputDelay so far described will be illustrated by way of example with reference to FIG. 10.

Each block in the first encoded video data stream 1001 to be spliced upstream of the splicing point represents one picture, and the characters carried in each block indicate the coding mode and the order of input to the video encoding apparatus, as in FIG. 2.

In the illustrated example, the second encoded video data stream 1002 is spliced immediately following the last picture B11 of the first encoded video data stream. In the second encoded video data stream 1002 also, each block represents one picture, and the characters carried in each block indicate the coding mode and the order of input to the video encoding apparatus. Arrows depicted above the second encoded video data stream 1002 indicate the reference pictures to which pictures B4 to B7, respectively, refer when encoded by forward frame prediction. On the other hand, arrows depicted below the second encoded video data stream 1002 indicate the reference pictures to which the pictures B4 to B7, respectively, refer when encoded by backward frame prediction.

In the second encoded video data stream 1002, the pictures B4, B2, B1, B3, and B5 are TFD pictures, as designated below the second encoded video data stream 1002. The pictures B6 and B7 are DLP pictures.

A block array 1003 presented below the second encoded video data stream 1002 indicates the values of the decoding delay CpbRemovalDelay and display delay DpbOutputDelay carried in PTSEI appended to each picture of the second encoded video data stream 1002. Each block in the upper row of the block array 1003 carries the value of the decoding delay CpbRemovalDelay for the corresponding picture in the second encoded video data stream 1002 located directly above that block. Likewise, each block in the lower row of the block array 1003 carries the value of the display delay DpbOutputDelay for the corresponding picture in the second encoded video data stream 1002 located directly above that block.

Spliced encoded video data 1004 generated by splicing the first and second encoded video data streams 1001 and 1002 is depicted below the block array 1003. In the illustrated example, the TFD pictures B4, B2, B1, B3, and B5 in the second encoded video data stream 1002 are discarded and are therefore not contained in the spliced encoded video data 1004.

NumRemovedTfds 1005 of the spliced encoded video data 1004 is depicted below the block array 1004. The NumRemovedTfds field of the BLA picture I8 carries the sum of the decoding intervals of the discarded TFD pictures (B4, B2, B1, B3, and B5) that follow I8 in decoding order, i.e., in the illustrated example, the value "10" which represents the number of pictures in units of fields that have been discarded after I8. Similarly, the NumRemovedTfds field of the DLP picture B6 carries the sum of the decoding intervals of the discarded TFD pictures (B5) that follow B6 in decoding order, i.e., in the illustrated example, the value "2" which represents the number of pictures in units of fields that have been discarded after B6. For the picture B7 and its subsequent pictures, the value of NumRemovedTfds remains 0 because there are no discarded TFD pictures that follow in decoding order.

A block array 1006 presented below the NumRemovedTfds 1005 of the spliced encoded video data 1004 indicates the values of the decoding delay CpbRemovalDelay and display delay DpbOutputDelay of the spliced encoded video data 1004 that have been corrected based on the NumRemovedTfds values. Each block in the upper row of the block array 1006 carries the corrected value of the decoding delay CpbRemovalDelay for the picture located directly above that block, and each block in the lower row of the block array 1006 carries the corrected value of the display delay DpbOutputDelay for the picture located directly above that block.

For the BLA picture I8, the corrected value of the display delay DpbOutputDelay is given as "10" by subtracting the NumRemovedTfds value "10" from the original value "20" of the display delay DpbOutputDelay. In this way, not only the original value but also the corrected value of the display delay DpbOutputDelay of the picture I8 can be expressed in terms of the difference between the decode time and the display time of the picture I8 taken by reference to the display time of the picture B9 for which the number of pictures to be reordered is the largest among the pictures that follow the picture I8.

For the DLP picture B6, the corrected value of the decoding delay CpbRemovalDelay is given as "2" by subtracting the difference "8" between the NumRemovedTfds value (=10) of the picture I8 and the NumRemovedTfds value (=2) of the picture B6 from the original value "10" of the decoding delay CpbRemovalDelay. Further, the corrected value of the display delay DpbOutputDelay of the picture B6 is given as "4" by subtracting the NumRemovedTfds value (=2) of the picture B6 from the original value "6" of the display delay DpbOutputDelay. For the picture B7 and its subsequent pictures, since the NumRemovedTfds value is 0, the corrected value of the decoding delay CpbRemovalDelay is obtained by subtracting the NumRemovedTfds value of the picture I8 from the original value of the decoding delay CpbRemovalDelay. For the picture B7 and its subsequent pictures, the display delay DpbOutputDelay remains unchanged.

As has been described above, when two or more encoded video data streams are spliced together without once decoding them, the video encoding apparatus according to the present embodiment need only store within the encoded video data the decoding delay and display delay correction parameters determined based on the number of pictures discarded at the time of splicing, and need not correct the decoding delay and display delay parameters determined at the time of encoding. Then, since the decoding delay and display delay of each picture can be corrected using the decoding delay and display delay correction parameters added at the time of splicing the encoded video data streams, the video decoding apparatus according to the present embodiment can decode and display each picture at correct timing.

Next, a second embodiment will be described. The second embodiment differs from the first embodiment in the structure of the encoded video data.

Figure 11:
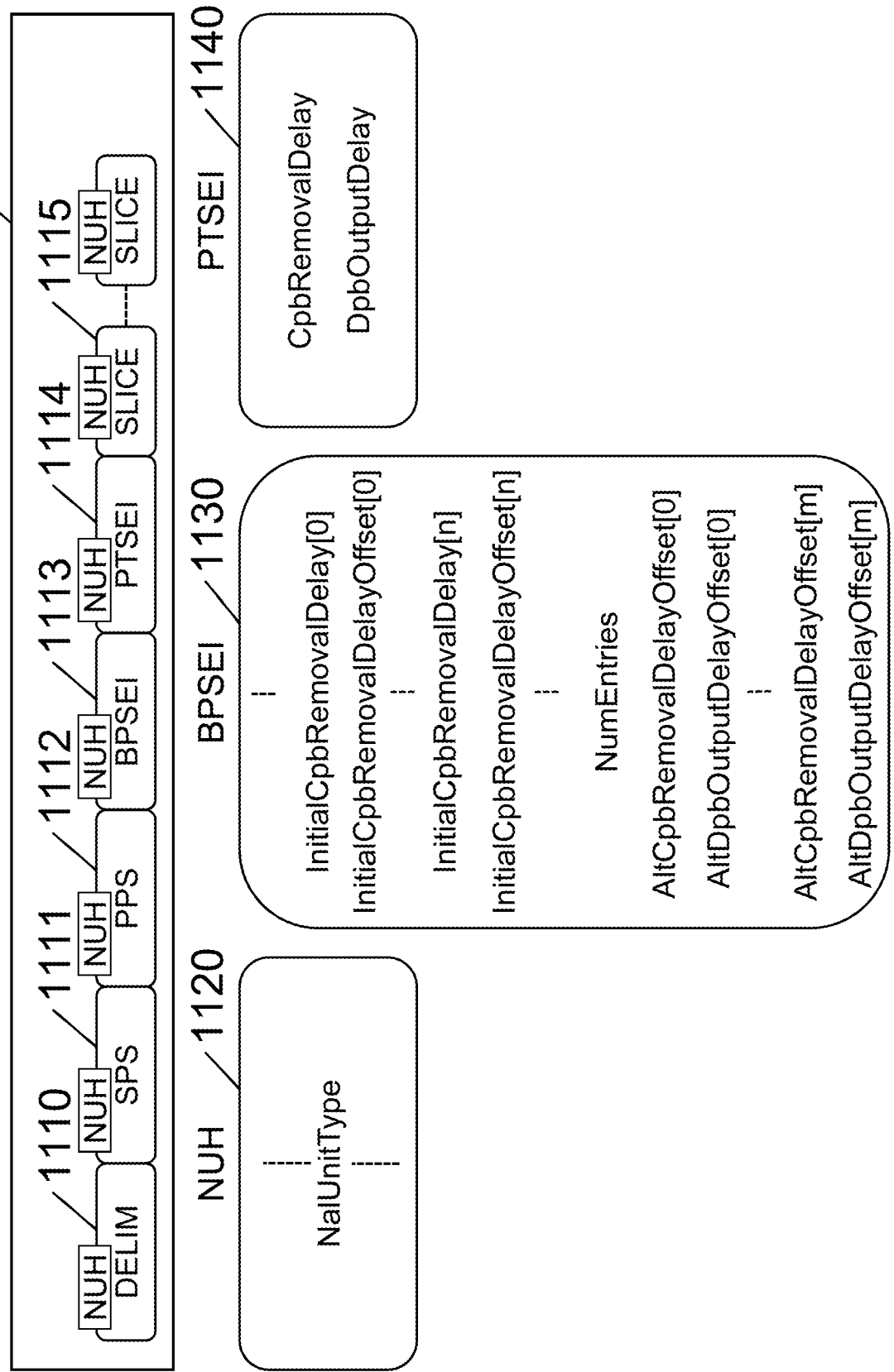
FIG. 11 is a diagram for explaining the data structure of one picture in encoded video according to the second embodiment.

Referring to FIG. 11, the structure of the encoded video data according to the second embodiment will be described. In common with the encoded picture structure according to the first embodiment depicted in FIG. 4, the data structure 1100 of one picture contains six kinds of NAL units 1110 to 1115. Of these, the BPSEI 1113 and PTSEI 1114 are different from the BPSEI 413 and PTSEI 414 depicted in FIG. 4. On the other hand, the DELIM 1110, SPS 1111, PPS 1112, SLICE 1115, and NUH 1120 are identical to the DELIM 410, SPS 411, PPS 412, SLICE 415, and NUH 420, respectively, depicted in FIG. 4.

The BPSEI 1113 contains a NumEntries field which carries a number calculated by adding 1 to the variable m that represents the value obtained by adding 2 to the number of pictures not discarded at the time of splicing among the TFD and DLP pictures located between a BLA picture and the next CRA picture. The BPSEI 1113 further contains as many AltCpbRemovalDelayOffset fields and AltDpbOutputDelayOffset fields as there are NumEntries. The NumEntries field, the AltCpbRemovalDelayOffset field, and the AltDpbOutputDelayOffset field together constitute another example of the correction information used for the correction of the decoding delay and display delay. On the other hand, the PTSEI 1140, unlike the PTSEI 440, does not contain the NumRemovedTfds field.

When the value of the NumEntries field is 0, the video decoding apparatus need not correct the values of CpbRemovalDelay and DpbOutputDelay for any of the BPSEI-appended picture and its subsequent pictures (preceding the next BPSEI-appended picture). On the other hand, when the value of the NumEntries field is not 0, the video decoding apparatus corrects the decoding delay CpbRemovalDelay of the kth picture in decoding order as counted from the BPSEI-appended picture by subtracting the value of AltCpbRemovalDelayOffset [k] from the original value of the decoding delay CpbRemovalDelay. Likewise, the video decoding apparatus corrects the display delay DpbOutputDelay by subtracting the value of AltDpbOutputDelayOffset [k] from the original value of the display delay DpbOutputDelay.

As described above, the difference from the first embodiment lies in the type of SEI that carries the corrected values of the CpbRemovalDelay and DpbOutputDelay fields. Therefore, the video encoding apparatus of the second embodiment differs from the video encoding apparatus of the first embodiment in the operation of the splicing point identification information processing unit 14. The following therefore describes the operation of the splicing point identification information processing unit 14.

The splicing point identification information processing unit 14 stores in the NumEntries field the value obtained by adding 1 to the variable m calculated in accordance with the operation flowchart of the video editing process illustrated in FIG. 7. Further, the splicing point identification information processing unit 14 stores the value of L[0]–L[k] in the kth AltCpbRemovalDelayOffset field (k=[0, m−1]). It also stores the value of L[k] in the kth AltDpbOutputDelayOffset.

Next, the operation of the video decoding apparatus according to the second embodiment will be described. The configuration of the video decoding apparatus according to the second embodiment is essentially the same as that of the video decoding apparatus according to the first embodiment. However, the video decoding apparatus of the second embodiment differs from that of the first embodiment in the operation of the picture decoding/display time determining unit 23. The following therefore describes the operation of the picture decoding/display time determining unit 23.

Only when the value of the NumEntries field in the BPSEI of the BPSEI-appended picture immediately preceding the picture to be decoded is not zero, does the picture decoding/display time determining unit 23 correct the values of the decoding delay CpbRemovalDelay and display delay DpbOutputDelay in the PTSEI of the picture in the following manner.

The decoding order of the picture as counted from the BPSEI-appended picture (in this case, a BLA picture) immediately preceding it is denoted as k (k=0, 1, 2, ... ). When k is equal to or larger than NumEntries, the picture decoding/display time determining unit 23 corrects the value of the decoding delay CpbRemovalDelay by subtracting the value of AltCpbRemovalDelayOffset [NumEntries−1] from the original value of the decoding delay CpbRemovalDelay of the kth picture. On the other hand, when k is smaller than NumEntries, the picture decoding/display time determining unit 23 corrects the value of CpbRemovalDelay for the kth picture by subtracting the value of AltCpbRemovalDelayOffset [k] from the original value of the decoding delay CpbRemovalDelay, and corrects the value of DpbOutputDelay by subtracting the value of AltDpbOutputDelayOffset from the original value of the display delay DpbOutputDelay.

Figure 12:
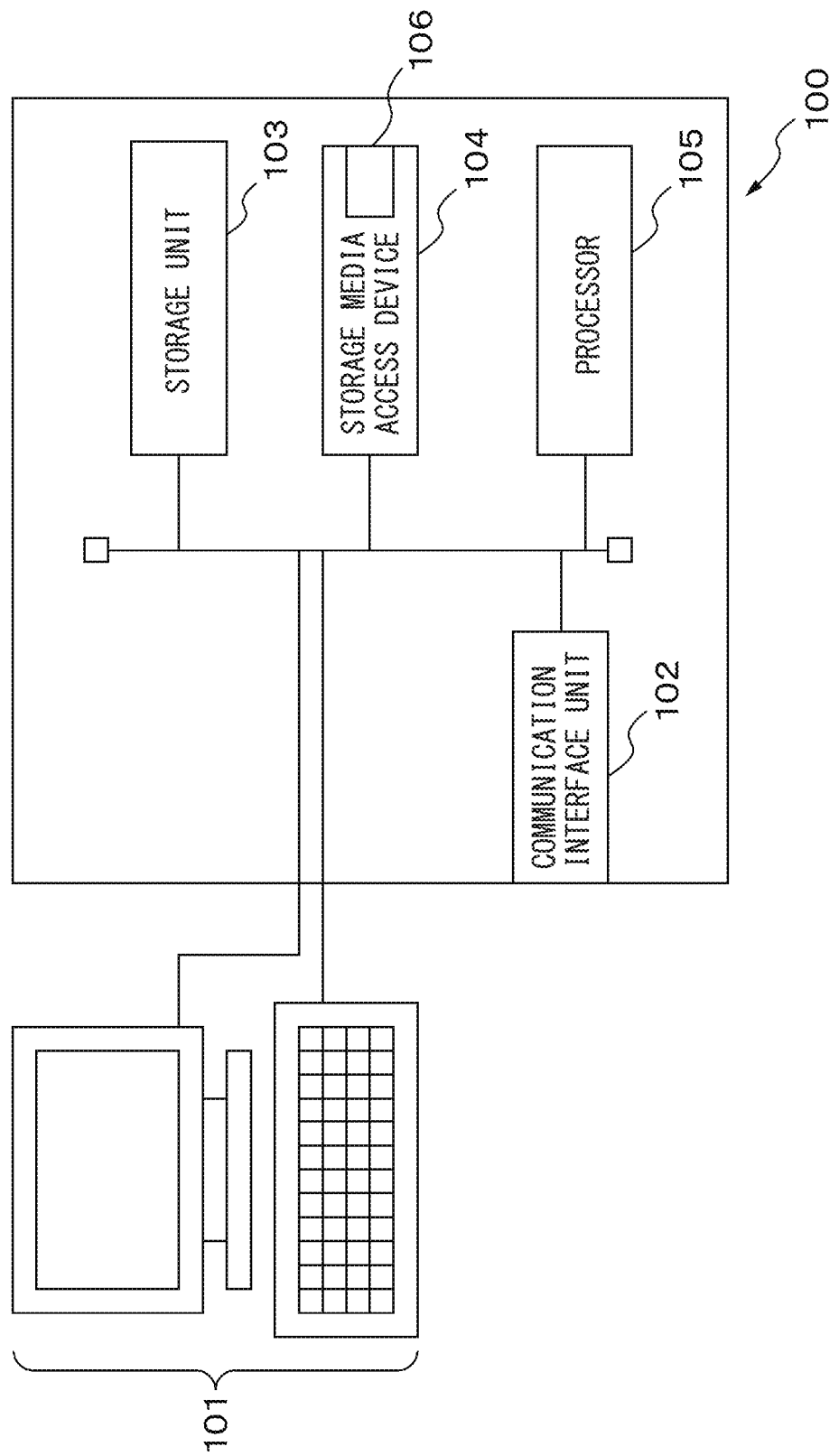
FIG. 12 is a diagram illustrating the configuration of a computer that operates as the video encoding apparatus or video decoding apparatus by executing a computer program for implementing the functions of the various units in the video encoding apparatus or video decoding apparatus according to any one of the embodiments or their modified examples.

FIG. 12 is a diagram illustrating the configuration of a computer that operates as the video encoding apparatus or video decoding apparatus by executing a computer program for implementing the functions of the various units in the video encoding apparatus or video decoding apparatus according to any one of the above embodiments or their modified examples.

The computer 100 includes a user interface unit 101, a communication interface unit 102, a storage unit 103, a storage media access device 104, and a processor 105. The processor 105 is connected to the user interface unit 101, communication interface unit 102, storage unit 103, and storage media access device 104, for example, via a bus.

The user interface unit 101 includes, for example, an input device such as a keyboard and a mouse, and a display device such as a liquid crystal display. Alternatively, the user interface unit 101 may include a device, such as a touch panel display, into which an input device and a display device are integrated. The user interface unit 101 generates, for example, in response to a user operation, an operation signal for selecting video data to be encoded, encoded video data to be edited, or encoded video data to be decoded, and supplies the operation signal to the processor 105. The interface unit 101 may also display the decoded video data received from the processor 105.

The communication interface unit 102 may include a communication interface for connecting the computer 100 to a video data generating apparatus, for example, a video camera, and a control circuit for the communication interface. Such a communication interface may be, for example, a Universal Serial Bus (USB) interface.

Further, the communication interface unit 102 may include a communication interface for connecting to a communication network conforming to a communication standard such as the Ethernet (registered trademark), and a control circuit for the communication interface.

In the latter case, the communication interface 102 receives video data to be encoded, encoded video data to be edited, or encoded video data to be decoded, from another apparatus connected to the communication network, and passes the received data to the processor 105. Further, the communication interface 102 may receive encoded video data, spliced encoded video data, or decoded video data from the processor 105 and may transmit the data to another apparatus over the communication network.

The storage unit 103 includes, for example, a readable/writable semiconductor memory and a read-only semiconductor memory. The storage unit 103 stores a computer program for video encoding or video decoding to be executed on the processor 105, and also stores the data generated as a result of or during the execution of the program.

The storage media access device 104 is a device that accesses a storage medium 106 such as a magnetic disk, a semiconductor memory card, or an optical storage medium. The storage media access device 104 accesses the storage medium 106 to read out, for example, the computer program for video encoding or video decoding to be executed on the processor 105, and passes the readout computer program to the processor 105.

The processor 105 generates encoded video data by executing the video encoding computer program according to any one of the above embodiments or their modified examples. The processor 105 then stores the encoded video data thus generated in the storage unit 103, or transmits the generated data to another apparatus via the communication interface unit 102. Further, the processor 105 generates spliced encoded video data by splicing together two encoded video data streams. The processor 105 then stores the spliced encoded video data generated in the storage unit 103, or transmits the generated data to another apparatus via the communication interface unit 102. Furthermore, the processor 105 decodes the encoded video data by executing the video decoding computer program according to any one of the above embodiments or their modified examples. The processor 105 then stores the decoded video data in the storage unit 103, presents the data to the user interface unit 101 for display, or transmits the data to another apparatus via the communication interface unit 102.

A computer program which is executed on a computer to implement the functions of the various units constituting the video encoding apparatus or video decoding apparatus according to each of the above embodiments or their modified examples may be distributed in the form stored in a semiconductor memory or in the form recorded on a recording medium such as an optical recording medium. The term "recording medium" used here does not a carrier wave.

The video encoding apparatus and video decoding apparatus according to the above embodiments or their modified examples are used in various applications. For example, the video encoding apparatus and video decoding apparatus are incorporated in a video camera, a video transmitting apparatus, a video receiving apparatus, a video telephone system, a computer, or a mobile telephone.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A video decoding method for decoding video data encoded by inter-frame predictive coding, comprising:

using splicing information indicating that the encoded video data has been generated by splicing second encoded video data to a trailing end of first encoded video data and discarded information indicating that one or more encoded pictures that are later in encoding order than a starting encoded picture in the second encoded video data spliced downstream of a splicing point at which the first encoded video data and the second encoded video data are spliced have been discarded to correct, based on correction information, a decoding delay for a picture that follows the starting encoded picture in the second encoded video data, and wherein the correction information includes discarded picture information for the starting encoded picture in the second encoded video data and discarded picture information for a decodable leading picture, the discarded picture information for the starting encoded picture in the second encoded video data is used to correct the decoding delay of each decodable leading picture that is later in decode time than the starting encoded picture in the second encoded video data, and includes a value corresponding to the sum of decoding intervals provided between a decoding time of each discarded picture for the starting encoded picture in the second encoded video data that is later in decoding order in the spliced video data than the starting encoded picture in the second encoded video data, and that has been discarded from the spliced video data before the encoded video data is received by a video decoding apparatus, and a decoding time of the picture that immediately precedes the discarded picture for the starting encoded picture in the second encoded video data in decoding order, and the discarded picture information for the decodable leading picture is used to correct the decoding delay of each decodable leading picture and includes a value corresponding to the sum of decoding intervals provided between a decoding time of each discarded picture for the decodable leading picture that is later in decoding order in the spliced video data than the decodable leading picture and that has been discarded from the spliced video data before the encoded video data is received by the video decoding apparatus, and a decoding time of the picture that immediately precedes the discarded picture for the decodable leading picture in decoding order, and wherein the correcting the decoding delay corrects the decoding delay of the decodable leading picture by subtracting a difference between the value of the discarded picture information for the starting encoded picture in the second encoded video data and the value of the discarded picture information for the decodable leading picture from the value of the decoding delay that has been set for the decodable leading picture before the second video data is spliced to the first video data.

2. The video decoding method according to claim 1, further comprising:

correcting the display delay of the starting encoded picture in the second encoded video data by subtracting the value of the discarded picture information for the starting encoded picture in the second encoded video data from the value of the display delay that has been set for the starting encoded picture in the second encoded video data before the second video data is spliced to the first video data; and correcting the display delay of the decodable leading picture by subtracting the value of the discarded picture information for the decodable leading picture from the value of the display delay that has been set for the decodable leading picture before the second video data is spliced to the first video data, wherein the decodable leading picture is later in decode time but earlier in display time than the starting encoded picture in the second encoded video data.

3. The video decoding method according to claim 1, wherein for a second encoded picture that follows the decodable leading picture and is earlier in decoding order than a picture encoded subsequently to the starting encoded picture in the second encoded video data without referring to any other pictures, and that refers only to a picture occurring later than the starting encoded picture in the second encoded video data, the correcting the decoding delay corrects the decoding delay of the second encoded picture by subtracting the value of the discarded picture information for the starting encoded picture in the second encoded video data from the value of the decoding delay for the second encoded picture that has been set before the second video data is spliced to the first video data.

* * * * *